United States Patent
Radmand et al.

(10) Patent No.: US 10,506,461 B2
(45) Date of Patent: Dec. 10, 2019

(54) METHOD AND APPARATUS FOR NOMINATION OF DATA TRANSMISSION SINK IN NETWORK OF GATEWAYS

(71) Applicant: Dell Products, LP, Round Rock, TX (US)

(72) Inventors: Pedram Radmand, Austin, TX (US); Ricardo R. Velasco, Cumming, GA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/647,095

(22) Filed: Jul. 11, 2017

(65) Prior Publication Data

US 2019/0021016 A1  Jan. 17, 2019

(51) Int. Cl.
*H04W 24/08* (2009.01)
*H04L 12/26* (2006.01)
(Continued)

(52) U.S. Cl.
CPC ........... *H04W 24/08* (2013.01); *H04L 43/065* (2013.01); *H04L 43/08* (2013.01); *H04L 43/10* (2013.01);
(Continued)

(58) Field of Classification Search
CPC ... H04W 24/08; H04W 40/04; H04W 36/165; H04W 36/0027; H04W 36/38;
(Continued)

(56) References Cited

U.S. PATENT DOCUMENTS 6,954,616 B2  10/2005  Liang
8,938,211 B2   1/2015  Das
(Continued)

FOREIGN PATENT DOCUMENTS

WO  2015/193849 A1  12/2015
WO  2016/186618 A1  11/2016
WO  2017/007721 A1   1/2017

OTHER PUBLICATIONS

Luo et al., "An Optimal Sink Selection Scheme for Multi-sink Wireless Sensor Networks", International Conference on Computer Science and Information Technology 2008, pp. 544-548. (Year: 2008).*

*Primary Examiner* — Joshua Kading
(74) *Attorney, Agent, or Firm* — Prol Intellectual Property Law, PLLC; H. Kenneth Prol

(57) ABSTRACT

An information handling system of a first gateway access point in a wireless network includes at least one wireless adapter for receiving a plurality of reply messages including information that can be used to calculate a plurality of traffic factor values describing traffic flow between one of a plurality of gateways in the wireless network and a cloud computing resource, and a processor executing code instructions of a wireless network gateway sink nomination system. For each of the plurality of traffic factors, the wireless network gateway sink nomination system may calculate and store within a memory a traffic factor value for each of the plurality of gateways, based on the reply messages, associate each calculated traffic factor value with the gateway from which the reply message used to calculate each value was received, identify a most desirable calculated traffic factor value for each of the gateways, identify a most desirable sink gateway from the plurality of gateways based on the most desirable calculated traffic factor values, transmit the identity of the most desirable sink gateway to each of the
(Continued)

plurality of gateways, and transmit data bound for transmission to the cloud computing resource to the most desirable sink gateway for delivery of the data to the cloud computing resource.

20 Claims, 10 Drawing Sheets

(51) Int. Cl.

| | |
|---|---|
| *H04W 36/16* | (2009.01) |
| *H04W 40/24* | (2009.01) |
| *H04L 12/721* | (2013.01) |
| *H04W 36/00* | (2009.01) |
| *H04W 36/38* | (2009.01) |
| *H04W 36/30* | (2009.01) |
| *H04W 36/10* | (2009.01) |
| *H04W 36/22* | (2009.01) |
| *H04W 40/04* | (2009.01) |
| *H04W 36/08* | (2009.01) |
| *H04W 88/08* | (2009.01) |
| *H04W 88/16* | (2009.01) |
| *H04W 84/22* | (2009.01) |

(52) U.S. Cl.
CPC ............ *H04L 43/16* (2013.01); *H04L 45/124* (2013.01); *H04W 36/0027* (2013.01); *H04W 36/0061* (2013.01); *H04W 36/00837* (2018.08); *H04W 36/08* (2013.01); *H04W 36/10* (2013.01); *H04W 36/165* (2013.01); *H04W 36/22* (2013.01); *H04W 36/30* (2013.01); *H04W 36/38* (2013.01); *H04W 40/04* (2013.01); *H04W 40/24* (2013.01); *H04L 43/0829* (2013.01); *H04L 43/0852* (2013.01); *H04L 43/0894* (2013.01); *H04W 84/22* (2013.01); *H04W 88/08* (2013.01); *H04W 88/16* (2013.01)

(58) Field of Classification Search
CPC ....... H04W 36/00837; H04W 36/0061; H04W 36/08; H04W 36/10; H04W 36/22; H04W 36/30; H04W 88/08; H04W 88/16; H04W 40/24; H04W 84/22; H04L 43/065; H04L 43/08; H04L 43/10; H04L 43/16; H04L 43/0894; H04L 43/0852; H04L 43/0829
See application file for complete search history.

(56) References Cited

U.S. PATENT DOCUMENTS

| | | | |
|---|---|---|---|
| 9,485,627 | B2 | 11/2016 | David |
| 9,894,580 | B1* | 2/2018 | Chen ................... H04W 36/18 |
| 2011/0235504 | A1* | 9/2011 | Nozaki ................. H04L 45/04 |
| | | | 370/221 |
| 2015/0134761 | A1 | 5/2015 | Sharma |
| 2015/0181381 | A1 | 6/2015 | Prechner |
| 2015/0365278 | A1 | 12/2015 | Chakrabarti |
| 2015/0381776 | A1 | 12/2015 | Seed |
| 2016/0128043 | A1 | 5/2016 | Shuman |
| 2016/0156682 | A1 | 6/2016 | Jeon |
| 2016/0231414 | A1 | 8/2016 | Steiner |
| 2016/0301707 | A1 | 10/2016 | Cheng |
| 2017/0135033 | A1* | 5/2017 | Vecera ................. H04W 48/20 |
| 2017/0273013 | A1* | 9/2017 | Edara ................... H04W 48/20 |
| 2018/0279146 | A1* | 9/2018 | Baroudi ................. H04W 4/70 |

* cited by examiner

| | Gateway 1 | Gateway 2 | Gateway 3 | Gateway N | Scale (MAX-MIN) | Threshold Requirement |
|---|---|---|---|---|---|---|
| Cost | $Cost_{GW1}$ (MAX) | $Cost_{GW2}$ | $Cost_{GW3}$ (MIN) | $Cost_{GWN}$ | $Cost_{GW1}$-$Cost_{GW3}$ | <32ms |
| Data Rate | $DR_{GW1}$ | $DR_{GW2}$ (MAX) | Does Not Meet Threshold | $DR_{GWN}$ (MIN) | $DR_{GW2}$-$DR_{GWN}$ | >20 kbit/s |
| Hops | $Hops_{GW1}$ (MIN) | $Hops_{GW2}$ | $Hops_{GW3}$ (MAX) | $Hops_{GWN}$ | $Hops_{GW3}$-$Hops_{GW1}$ | <7 hops |
| RSSI | Does Not Meet Threshold | $RSSI_{GW2}$ (MIN) | $RSSI_{GW3}$ | $RSSI_{GWN}$ (MAX) | $RSSI_{GWN}$-$RSSI_{GW2}$ | >-80 dBm |
| Latency | $LAT_{GW1}$ (MAX) | $LAT_{GW2}$ | $LAT_{GW3}$ (MIN) | $LAT_{GWN}$ | $LAT_{GW1}$-$LAT_{GW3}$ | <50ms |
| Lost Packets | $LP_{GW1}$ (MAX) | $LP_{GW2}$ (MAX) | $LP_{GW3}$ | $LP_{GWN}$ (MIN) | $LP_{GW2}$-$LP_{GWN}$ | <5% |

Factor Matrix 300

*FIG. 3*

|  | Gateway 1 | Gateway 2 | Gateway 3 | Gateway N |
|---|---|---|---|---|
| Cost | $Cost_{GW1NORM}$ | $Cost_{GW2NORM}$ | $Cost_{GW3NORM}$ | $Cost_{GWNNORM}$ |
| Data Rate | $DR_{GW1NORM}$ | $DR_{GW2NORM}$ | $DR_{GW3NORM}$ | $DR_{GWNNORM}$ |
| Hops | $Hops_{GW1NORM}$ | $Hops_{GW2NORM}$ | Does Not Meet Threshold | $Hops_{GWNNORM}$ |
| RSSI | Does Not Meet Threshold | $RSSI_{GW2NORM}$ | $RSSI_{GW3NORM}$ | $RSSI_{GWNNORM}$ |
| Latency | $LAT_{GW1NORM}$ | $LAT_{GW2NORM}$ | $LAT_{GW3NORM}$ | $LAT_{GWNNORM}$ |
| Lost Packets | $LP_{GW1NORM}$ | $LP_{GW2NORM}$ | $LP_{GW3NORM}$ | $LP_{GWNNORM}$ |

Normalized Factor Matrix 400

*FIG. 4*

| | Best Gateway | Best Factor Value |
|---|---|---|
| Cost | GW3 | 5 ms |
| Data Rate | GW2 | 200 kbit/s |
| Hops | GW1 | 2 |
| RSSI | GW2 | -40 dBm |
| Latency | GW3 | 10 ms |
| Lost Packets | GWN | 1% |

Factor Optimization Lookup Table 500

*FIG. 5*

METHOD AND APPARATUS FOR NOMINATION OF DATA TRANSMISSION SINK IN NETWORK OF GATEWAYS

FIELD OF THE DISCLOSURE

The present disclosure generally relates to the field of communication of wireless access points within a wireless network, and more specifically to nomination of one gateway within a network of gateways to act as a sink for transmissions from all gateways in a network of data to the cloud.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system may include telecommunication, network communication, and video communication capabilities. Further, the information handling system may include routing traffic bound for delivery to the cloud in a network of gateways through a single sink gateway.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a factor matrix according to an embodiment of the present disclosure;

FIG. 4 is a graphical diagram illustrating a normalized factor matrix according to an embodiment of the present disclosure;

FIG. 5 is a graphical diagram illustrating a factor optimization lookup table according to an embodiment of the present disclosure;

The use of the same reference symbols in different drawings may indicate similar or identical items.

DETAILED DESCRIPTION OF THE DRAWINGS

Figure 1:
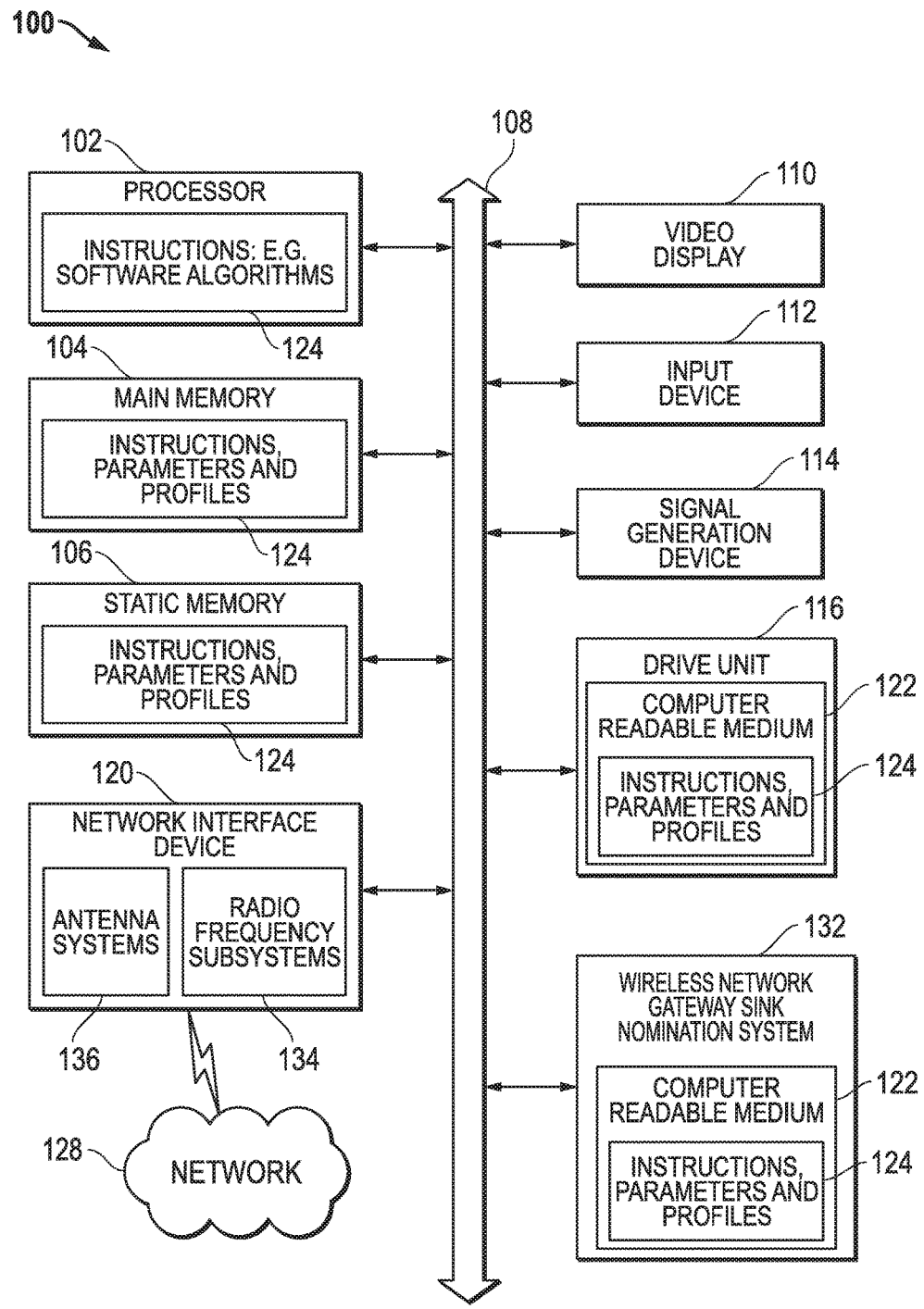
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Mobile information handling systems, such as smart phones, tablets, and laptop computers, as well as small, low power devices operating within the Internet of Things (IoT) communicate with one another and with the cloud via wireless networks, including. Each such network may include one or more gateway devices that act as communication hubs, gathering data from a plurality of the IoT sensor devices, and between other mobile information handling systems. One of these gateway device communication hubs in network may act as a sink, meaning all data from each of the sensors and mobile information handling systems in the network may eventually end up at this gateway sink, arriving either directly from nearby IoT sensors, directly from mobile information handling systems, or by one of the other gateway devices in the wireless network. The gateway sink in such a network may be solely responsible for transmitting the gathered data of the entire network to a cloud computing resource.

Many nodes (e.g. IoT sensors and gateway devices) within a WPAN network communicate with one another using either the IPv6 routing protocol for low-power and lossy networks (RPL) network protocol, or the ad-hoc on-demand distance vector routing (AODV) network protocol. The RPL network protocol allows one specifically designated node to operate as a gateway sink, and does not alter this designation once the WPAN has been established. Further, the RPL network protocol does not allow for examination of the characteristics of network traffic for the gateways' WPAN in deciding which gateway to designate as the sink. The AODV network protocol allows the designation of the sink gateway to vary over time (e.g. from one gateway node to another within the WPAN) based on an examination of which gateway uses the fewest hops to collect data from each of the nodes in the WPAN, but it does not allow for an examination of any traffic characteristics other than the number of hops. A solution is needed to flexibly designate the most efficient gateway as the sink for a WPAN or other wireless network by examining the efficiency of each gateway in a network relating to a plurality of traffic factors, not just the number of hops, and by dynamically assigning the most efficient gateway as the sink.

Embodiments of the present disclosure provide such a solution by measuring the functionality of each gateway in a wireless network for a plurality of traffic factors, normalizing the measurements across all gateways, assigning a score for each traffic factor to each gateway, identifying the gateway having the highest score for each traffic factor, and, based on these highest scores, identifying a single gateway to act as the sink gateway for the wireless network. The plurality of traffic factors may include, but may not be limited to, for example, cost, data rate, hops, received signal strength indicators (RSSI), latency, and lost packets. Embodiments of the present disclosure further allow for routine updates of these calculations and resulting assignments of new sink gateways at preset time intervals.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer (e.g., personal digital assistant (PDA) or smart phone), tablet computer, mobile device (e.g., personal digital assistant (PDA) or smart phone), server (e.g., blade server or rack server), a wearable computing device, IOT device, a consumer electronic device, a network server or storage device, a switch router, wireless router, wireless access point or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more disk drives, one or more communications ports for communicating with external devices, as well as, various input and output (110) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent a gateway device operating as wireless network access point located anywhere within a network of access points. The network of access points may include, but may not be limited to a wide area network (WAN), a local area network (LAN), wireless local area network (WLAN), a wireless personal area network (WPAN), a wireless wide area network (WWAN), or other network having a mesh architecture or a partial mesh architecture. Mesh or partial mesh architecture allows for communication among gateways and for hops for data transmission to a nominated sink network gateway. A gateway device may execute instructions via a processor for a wireless network gateway sink nomination system 132 according to embodiments disclosed herein. The wireless network gateway sink nomination system 132 of various embodiments of the present disclosure may operate in some example embodiments as a software agent, in whole or in part, within a gateway device or other wireless network access point while other portions of the wireless network gateway sink nomination system 132 may operate on remote server systems. Information handling system 100 may also represent a networked server or other system and administer some or all aspects of the wireless network gateway sink nomination system 132 via instructions executed on a processor according to various embodiments herein involving remote operation of such systems.

For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100. In embodiments, code instructions 124 may operate the wireless network gateway sink nomination system 132 via software, firmware, hard wired instructions, or some combination operating on one or more information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the wireless network gateway sink nomination system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or other display device. Additionally, the information handling system 100 may include an alpha numeric input device 112, such as a keyboard, and/or a cursor control device, such as a mouse, touchpad, or gesture or touch screen input.

The information handling system 100 can also include a disk drive unit 116, and a signal generation device 118, such as a speaker or remote control. The information handling system 100 can also represent a server device whose resources can be shared by multiple client devices, or it can represent an individual client device, such as a desktop personal computer, a laptop computer, a tablet computer, or a mobile smartphone.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications. Each radio frequency subsystem 134 may communicate with one or more wireless technology protocols. The wireless adapter 120 may also include antenna system 136 which may be tunable antenna systems for use with the system and methods disclosed herein. In other aspects, the information handling system 100 operating as a wireless communication device may operate a plurality of wireless adapters 120 for concurrent radio operation in one or more wireless communication bands.

The wireless network in which a gateway network access point operates may have a wireless mesh architecture or partial mesh architecture in accordance with mesh networks described by the wireless data communications standards or similar standards. This may include wireless ad hoc networked systems. The wireless adapter 120 may also connect to the external network and to mobile information handling systems via a WPAN, WLAN, WWAN or similar wireless switched Ethernet connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. The wireless adapter 120 can represent an add-in card, wireless network interface module that is integrated with a main board of the information handling system or integrated with another wireless network interface capability, or any combination thereof.

In an embodiment the wireless adapter 120 may include one or more radio frequency subsystems 134 including transmitters and wireless controllers for connecting via a multitude of wireless links. In an example embodiment, an information handling system may have an antenna system transmitter 136 for 4G LTE and/or 5G small cell WWAN, Wi-Fi WLAN or WiGig connectivity and one or more additional antenna system transmitters 132 for macro-cellular communication. The radio frequency subsystems 134 include wireless controllers to manage authentication, connectivity, communications, power levels for transmission, buffering, error correction, baseband processing, and other functions of the wireless adapter 120.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. Wireless adapter 120 may also include one or more radio frequency subsystems 134 including transmitters and wireless controllers for connecting via a multitude of network technologies. For example, instructions 124 may execute a wireless network gateway sink nomination system 132, software agents, or other aspects or components. Similarly instructions 124 may execute the wireless network gateway sink nomination system 132 disclosed herein for identifying one gateway device in a network of gateway devices associated with a best connection with a cloud computing resource as a sink gateway device through which all other gateway devices in the network may route data bound for the cloud, as described in greater detail below.

Various software modules comprising application instructions 124 may be coordinated by an operating system (OS), one or more real-time operating systems (RTOS), and/or via an application programming interface (API). An example operating system may include Windows®, Android®, and other OS types known in the art. Example real-time operating systems may include operating systems designed for wireless access points operating within the IoT, including but not limited to Contiki, TinyOS, FreeRTOS executing OpenWSN, Zephyr, and mbed.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, IoT computing devices, wearable computing devices, a set-top box (STB), a PDA, a mobile information handling system, a palmtop computer, a laptop computer, a desktop computer, a communications device, an access oint (AP), a base station transceiver, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 and the wireless network gateway sink nomination system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the wireless network gateway sink nomination system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the wireless network gateway sink nomination system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The wireless network gateway sink nomination system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The wireless network gateway sink nomination system 132 computer readable medium 122 may also contain space for data storage. The information handling system 100 may also include a wireless network gateway sink nomination system 132 that may be operably connected to the bus 108. The wireless network gateway sink nomination system 132 may perform tasks related to identifying one of a plurality of gateways within a network of gateways associated with a best connection to a cloud computing resource as a sink gateway through which all other gateways in the network route data bound for the cloud. In an embodiment, the wireless network gateway sink nomination system 132 may communicate with the main memory 104, the processor 102, the video display 110, the alpha-numeric input device 112, the signal generation device 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
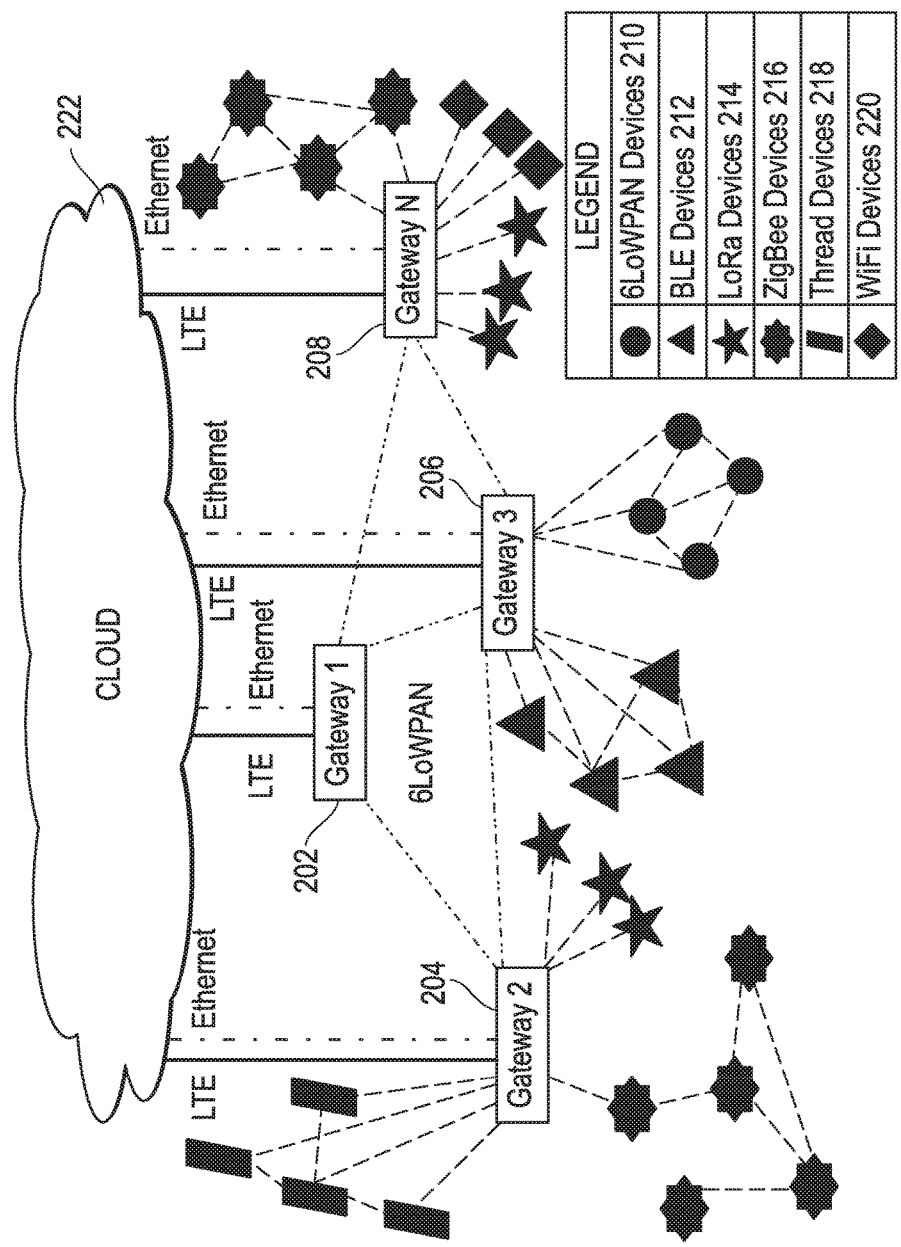
FIG. 2 is a block diagram illustrating a network of wireless access points according to an embodiment of the present disclosure.

FIG. 2 is a block diagram illustrating a plurality of networks of wireless access points in communication with gateway devices having access to cloud computing resources according to an embodiment of the present disclosure. As shown in FIG. 2, a network of wireless access points may include one or more wireless gateway access points 202, 204, 206, and 208 and one or more access points operating according to a plurality of physical layer protocols, network protocols, transport protocols, and application protocols. The network of embodiments of the present disclosure may include, but may not be limited to a wide area network (WAN), a local area network (LAN), wireless local area network (WLAN), a wireless personal area network (WPAN), a wireless wide area network (WWAN), or other wireless network. For example, as shown in the legend, the network may also include wireless access points operating according to the 6LoWPAN physical layer protocol 210, the LoRa physical layer protocol (modulation LoRa FSK) 214, the ZigBee network layer protocol 216, and the Thread network layer protocol 218. Each of these wireless access points may also use different types of transport layer protocols, and different types of application layer protocols from one another. It is contemplated each network may include any number of gateways greater than one, including but not limited to gateways numbering one to N, as shown in FIG. 2.

Each of the groups of wireless access point devices shown in the legend in FIG. 2 may create separate "ecosystems" of devices. For example, LoRa devices 214 may only be capable of communicating with other LoRa devices, ZigBee devices 216 may only be capable of communicating with other ZigBee devices 216, and Thread devices 218 may only be capable of communicating with other Thread devices 218. Each of the gateway devices 202-208 in an embodiment may be capable of receiving and processing data packets from each of these groups of wireless access point devices 210-220, and transmitting the data payloads from those data packets or the data packets themselves to a cloud computing resource 222. The various types of wireless access points illustrated in FIG. 2 are only examples of wireless access points having differing physical, network, transport, and application layer protocols from one another. These examples are meant to be descriptive rather than limiting. Other types of wireless access points within a network operating according to other physical, network, transport, and application layer protocols are also contemplated.

Each gateway in an embodiment may be in communication with all other gateways. In other embodiments, as shown in FIG. 2, some gateways (e.g. gateways 1 202 and 3 206) may be in communication with all other gateways, while other gateways (e.g. gateways 2 204 and N 208) may be in communication with only some of the other gateways. In an embodiment, each gateway device 202-208 may transmit a broadcast message, such as for example, an internet control message protocol (ICMP) echo request message to the same cloud computing resource 222, and receive a response, such as for example, an echo reply ICMP message. Each response received may include information that can be used to measure several traffic factors associated with the gateway from which the message originated. For example, in an embodiment, gateway 1 202 may transmit an echo request ICMP message to the cloud 222, and may receive an echo reply ICMP message from the cloud 222 including information used to measure traffic factors such as, for example, cost, data rate, hops, RSSI, latency, and lost packets. As another example, in an embodiment, gateway 2 204, gateway 3 206, and gateway N 208 may also transmit echo request ICMP messages to the cloud 222 and may each receive an echo reply ICMP message including information for measuring the cost, data rate, hops, RSSI, latency, and lost packets associated with communication between the cloud 222 and gateways 2 204, 3 206, and N 208, respectively. In such a way, a plurality of traffic factors may be measured for each of the gateways 202-208 in the network.

Each of the gateways 202-208 in an embodiment may also transmit these measurements to all of the other gateways in the network. For example, gateway 1 202 may transmit a measurement of each of the traffic factors for gateway 1 202 to all of the other gateways 204-208 in the network by forwarding the echo reply ICMP message it received from the cloud 222 to each of the other gateways 204-208. Each of the other gateways 204-208 may similarly transmit the echo reply ICMP messages they each also received from the same cloud computing resource 222 to gateway 1 202 in an embodiment. The wireless network gateway sink nomination system operating at one or more of the gateway devices 202-208 in an embodiment may operate to receive or collect each of the echo reply ICMP messages from each of the gateways in the system, normalize the measurements calculated based on each of these echo reply ICMP messages, and/or identify which of gateways 202-208 may most efficiently serve as the sink gateway, based on the normalized measurements.

Further, once the sink gateway is identified in an embodiment, the identity of the sink gateway may be transmitted to all gateways 202-208 in the network, and all gateways not identified as the sink gateway may proceed to channel all data bound for the cloud 222 through that sink gateway. For example, if gateway 1 202 were identified as the sink gateway, gateway 2 204 in an embodiment may forward all data it receives from thread devices 218, zigbee devices 216, and LoRa devices 214 that are bound for the cloud 222 to gateway 1 202 for delivery to the cloud 222. As another example, if gateway 1 202 were identified as the sink gateway, gateway 3 206 in an embodiment may forward all data it receives from BLE devices 212 and 6LoWPAN devices 210 that are bound for the cloud 222 to gateway 1 202 for delivery to the cloud 222. As yet another example, if gateway 1 202 were identified as the sink gateway, gateway N 208 in an embodiment may forward all data it receives from LoRa devices 214, WiFi devices 220, and Zigbee devices 216 that are bound for the cloud 222 to gateway 1 202 for delivery to the cloud 222. In such a way, the wireless network gateway sink nomination system in an embodiment may channel all network traffic to the cloud through a gateway sink identified as most efficient for communication to the cloud 222 by measuring a plurality of network traffic factors and dynamically assigning the most efficient gateway device as the sink gateway.

FIG. 3 is a graphical diagram illustrating a factor matrix evaluating traffic conditions at each gateway in a network according to an embodiment of the present disclosure. In an embodiment, each gateway device may transmit an internet control message protocol (ICMP) message to the same cloud computing resource, and receive a response that can be used to measure the efficiency of the transmission. Each gateway in a network may use a ping computer network administration software utility to send an echo request ICMP and receive an echo reply ICMP. Once the pin networking utility at each gateway receives the echo reply ICMP in an embodiment, the ping networking utility may use the received echo reply ICMP to calculate cost, data rate, hops, RSSI, latency, and lost packets, and any other factors characterizing the efficiency associated with the transmission of the echo request ICMP and return transmission to the gateway of the echo reply ICMP. By measuring the values of these traffic factors in such a way, the efficiency of the communication between each gateway and the same cloud computing resource may be examined.

For example, in an embodiment where a network includes a plurality of gateways numbered 1 to N, gateway 1 may transmit an echo request ICMP message to a cloud computing resource and receive an echo reply ICMP message. The number N in an embodiment may be the total number of gateways within the network and may have any whole number value greater than one. In such an embodiment, gateway 1 may use the ping networking utility to measure a cost $Cost_{GW1}$, a data rate $DR_{GW1}$, $RSSI_{GW1}$, latency $LAT_{GW1}$, and number of lost packets $LP_{GW1}$ associated with the transmission of the echo request ICMP message to the cloud computing resource. Gateway 1 in an embodiment may also use the ping networking utility to measure the number of hops taken to reach the cloud computing resource $Hops_{GW1}$.

The wireless network gateway sink nomination system operating at gateway 1 in an embodiment may determine whether each of these measurements meets a threshold requirement defined for each traffic factor within the factor matrix 300, as shown in FIG. 3. Threshold requirements may be defined such that gateways whose measured traffic factors do not meet the threshold requirement cannot be considered as the most efficient gateway in the network with respect to that traffic factor. Presetting threshold requirements in an embodiment may also operate to ensure the scale of calculated traffic factor values—a variable that may significantly impact later normalization methods operated upon the calculated traffic factors—remains within normal tolerances for each traffic factor.

For example, the threshold requirements shown in FIG. 3 may be defined in an embodiment such that gateways whose measured cost includes a time-to-live (TTLE) value that is greater than 32 milliseconds cannot be considered as the most efficient gateway in the network with respect to cost. As another example, the threshold requirements shown in FIG. 3 may be defined in an embodiment such that gateways whose measured data rate is less than 20 kbit/s cannot be considered as the most efficient gateway in the network with respect to data rate. As another example, the threshold requirements shown in FIG. 3 may be defined in an embodiment such that gateways whose measured hops number greater than seven cannot be considered as the most efficient gateway in the network with respect to hops. As another example, the threshold requirements shown in FIG. 3 may be defined in an embodiment such that gateways whose measured RSSI is less than −80 dBm cannot be considered as the most efficient gateway in the network with respect to RSSI. As another example, the threshold requirements shown in FIG. 3 may be defined in an embodiment such that gateways whose measured latency is greater than 50 milliseconds cannot be considered as the most efficient gateway in the network with respect to latency. As yet another example, the threshold requirements shown in FIG. 3 may be defined in an embodiment such that gateways whose measured packet loss is greater than 5% cannot be considered as the most efficient gateway in the network with respect to packet loss.

As also shown in FIG. 3, the wireless network gateway sink nomination system in an embodiment may store each of the measurements of gateway 1 traffic factors meeting the threshold requirements within the factor matrix 300. For example, as shown in the second column from the left in FIG. 3, the wireless network gateway sink nomination system may determine the measured RSSI for gateway 1 does not meet the threshold requirement of −80 dBm for RSSI, and as a consequence, may not store the measured RSSI for gateway 1 within the factor matrix 300.

As described above, each of the gateways in an embodiment may also transmit echo reply ICMP messages that can be used to make measurements of the traffic factors between each of the gateways and the same cloud computing resource to all of the other gateways in the network. For example, gateways 2-N may each transmit to gateway 1 an echo reply ICMP message, and gateway 1 may reference each reply ICMP message to measure the cost, data rate, hops, RSSI, latency, and lost packets associated with communication between each of gateways 2-N and the same cloud computing resource to which gateway 1 transmitted the echo request and from which gateway 1 received the echo reply. As gateway 1 calculates the measured traffic factors (e.g. cost, data rate, hops, RSSI, latency, and lost packets) associated with gateways 2-N in an embodiment, the wireless network gateway sink nomination system operating at gateway 1 may determine whether each traffic factor value for each gateway meets the threshold requirement for that traffic factor, and for the traffic factors that do meet the threshold requirement, store the traffic factor value for each gateway within the factor matrix 300.

For example, gateway 1 may calculate measurements for traffic factors associated with gateway 2, determine each of these traffic factors meet the threshold requirements, and store within factor matrix 300 a cost $Cost_{GW2}$, a data rate $DR_{GW2}$, the number of hops $Hops_{GW2}$, a RSSI having a value $RSSI_{GW2}$, a latency $LAT_{GW2}$, and a number of lost packets $LP_{GW2}$ associated with communication between gateway 2 and the same cloud computing resource pinged by gateway 1. As another example, gateway 1 may calculate measurements for traffic factors associated with gateway 3, determine each of these traffic factors, except for the data rate meet the threshold requirements, and store within factor matrix 300 a cost $Cost_{GW3}$, the number of hops $Hops_{GW3}$, a RSSI having a value $RSSI_{GW3}$, a latency $LAT_{GW3}$, and a number of lost packets $LP_{GW3}$ associated with communication between gateway 3 and the same cloud computing resource pinged by gateway 1. As yet another example, gateway 1 may calculate measurements for traffic factors associated with gateway N, determine each of these traffic factors meet the threshold requirements, and store within factor matrix 300 a cost $Cost_{GWN}$, a data rate $DR_{GWN}$, the number of hops $Hops_{GWN}$, a RSSI having a value $RSSI_{GWN}$, a latency $LAT_{GWN}$, and a number of lost packets $LP_{GWN}$ associated with communication between gateway N and the same cloud computing resource pinged by gateway 1.

The wireless network gateway sink nomination system operating at gateway 1 in an embodiment may also identify a maximum and minimum measured value for each traffic factor across all gateways in the network, and may identify a scale of stored values for each of the measured traffic factors in the factor matrix 300. For example, the wireless network gateway sink nomination system in an embodiment may identify the cost associated with gateway 1 $Cost_{GW1}$ as the maximum measured cost and the cost associated with gateway 3 $Cost_{GW3}$ as the minimum measured cost, and may record the scale of values for measured costs as ranging from the minimum $Cost_{GW3}$ to the maximum $Cost_{GW1}$. As another example, the wireless network gateway sink nomination system in an embodiment may identify the data rate associated with gateway 2 $DR_{GW2}$ as the maximum measured data rate and the data rate associated with gateway N $DR_{GWN}$ as the minimum measured data rate, and may record the scale of values for measured data rates as ranging from the minimum $DR_{GWN}$ to the maximum $DR_{GW2}$.

As another example, the wireless network gateway sink nomination system in an embodiment may identify the number of hops associated with gateway 3 $Hops_{GW3}$ as the maximum measured number of hops and the number of hops associated with gateway 1 $Hops_{GW1}$ as the minimum measured number of hops, and may record the scale of values for measured number of hops as ranging from the minimum $Hops_{GW1}$ to the maximum $Hops_{GW3}$. As another example, the wireless network gateway sink nomination system in an embodiment may identify the RSSI associated with gateway N $RSSI_{GWN}$ as the maximum measured RSSI and the RSSI associated with gateway 2 $RSSI_{GW2}$ as the minimum measured RSSI, and may record the scale of values for measured RSSI as ranging from the minimum $RSSI_{GW2}$ to the maximum $RSSI_{GWN}$. As another example, the wireless network gateway sink nomination system in an embodiment may identify the latency associated with gateway 1 $LAT_{GW1}$ as the maximum measured latency and the latency associated with gateway 3 $LAT_{GW3}$ as the minimum measured latency, and may record the scale of values for measured latency as ranging from the minimum $LAT_{GW3}$ to the maximum $LAT_{GW1}$. As yet another example, the wireless network gateway sink nomination system in an embodiment may identify the number of lost packets associated with gateway 2 $LP_{GW2}$ as the maximum measured number of lost packets and the number of lost packets associated with gateway N $LP_{GWN}$ as the minimum measured number of lost packets, and may record the scale of values for measured lost packets as ranging from the minimum $LP_{GWN}$ to the maximum $LP_{GW2}$.

FIG. 4 is a graphical diagram illustrating a normalized factor matrix evaluating normalized traffic conditions at each gateway in a network according to an embodiment of the present disclosure. A wireless network gateway sink nomination system in an embodiment may generate a normalized factor matrix 400, as shown in FIG. 4 by normalizing the measured traffic factors stored in a factor matrix, such as the factor matrix described directly above with reference to FIG. 3. The wireless network gateway sink nomination system in an embodiment may normalize the measured traffic factors in the factor matrix in order to rescale the measured traffic factor values relative to some size value, or to bring the probability distribution of the traffic factor values for each gateway into alignment. Normalizing the traffic factor values across all gateways in an embodiment may make comparisons of each gateway's traffic factors more accurate in assessing a most efficient gateway.

The wireless network gateway sink nomination system in an embodiment may use one of various types of normalization formulas that function to make each normalized traffic factor scale invariant when generating the normalized factor matrix 400, including, but not limited to a standard score, student's t-statistic, studentized residual, standardized moment, coefficient of variation, and/or feature scaling. For example, a feature scaling calculation may follow the formula:

$$X' = \frac{X - X_{MIN}}{X_{MAX} - X_{MIN}}$$

As described above with reference to FIG. 3, the scale of each traffic factor (maximum—minimum) may be calculated in the factor matrix 300. The factor matrix 300 may also include a threshold requirement for each traffic factor, as also described above. For some traffic factors, the threshold requirement is a defined maximum under which each value stored in the factor matrix 300 must fall in an embodiment, including the cost, number of hops, latency, and number of lost packets. For other traffic factors, the threshold requirement is a defined minimum above which each value stored in the factor matrix 300 must fall in an embodiment, including the data rate and the RSSI.

According to a feature scaling calculation, a normalized cost traffic factor value for gateway 1 may be calculated using the formula:

$$Cost_{GW1NORM} = \frac{Cost_{GW1} - Cost_{MIN}}{Cost_{Threshold} - Cost_{MIN}}$$

As described above, the threshold value stored in the factor matrix for the cost traffic factor is a defined maximum for the cost scale. By using this feature scaling calculation, a normalized cost traffic factor may be identified for gateway 1 that adjusts for the full scale of cost traffic values measured across all gateways. Using the feature scaling calculation again, a normalized cost traffic factor value for gateways 2, 3, and N may be calculated as follows:

$$Cost_{GW2NORM} = \frac{Cost_{GW2} - Cost_{MIN}}{Cost_{Threshold} - Cost_{MIN}}$$

$$Cost_{GW3NORM} = \frac{Cost_{GW3} - Cost_{MIN}}{Cost_{Threshold} - Cost_{MIN}}$$

$$Cost_{GWNNORM} = \frac{Cost_{GWN} - Cost_{MIN}}{Cost_{Threshold} - Cost_{MIN}}$$

For the RSSI, in which the threshold requirement value acts as a defined minimum, the feature scaling calculation for gateways 1-N may be as follows:

$$RSSI_{GW1NORM} = \frac{RSSI_{GW1} - RSSI_{MIN}}{RSSI_{MAX} - RSSI_{Threshold}}$$

$$RSSI_{GW2NORM} = \frac{RSSI_{GW2} - RSSI_{MIN}}{RSSI_{MAX} - RSSI_{Threshold}}$$

$$RSSI_{GW3NORM} = \frac{RSSI_{GW3} - RSSI_{MIN}}{RSSI_{MAX} - RSSI_{Threshold}}$$

$$RSSI_{GWNNORM} = \frac{RSSI_{GWN} - RSSI_{MIN}}{RSSI_{MAX} - RSSI_{Threshold}}$$

By using similar formulas with respect to the other traffic factors in an embodiment, the wireless network gateway sink nomination system may generate a normalized factor matrix 400 including normalized traffic factors for gateway 1 (e.g. $Cost_{GW1NORM}$, $DR_{GW1NORM}$, $Hops_{GW1NORM}$, $LAT_{GW1NORM}$, and $LP_{GW1NORM}$), gateway 2 (e.g. $Cost_{GW2NORM}$, $DR_{GW2NORM}$, $Hops_{GW2NORM}$, $RSSI_{GW2NORM}$, $LAT_{GW2NORM}$, and $LP_{GW2NORM}$), gateway 3 (e.g. $Cost_{GW3NORM}$, $DR_{GW3NORM}$, $RSSI_{GW3NORM}$, $LAT_{GW3NORM}$, and $LP_{GW3NORM}$), up to gateway N (e.g. $Cost_{GWNNORM}$, $DR_{GWNNORM}$, $Hops_{GWNNORM}$, $RSSI_{GWNNORM}$, $LAT_{GWNNORM}$, and $LP_{GWNNORM}$). The wireless network gateway sink nomination system in an embodiment may not calculate a normalized traffic factor value for traffic factor values that did not meet the threshold requirements for storage within the factor matrix, as shown in FIG. 4 with respect to the RSSI value for gateway 1 and the number of hops value for gateway 3.

FIG. 5 is a graphical diagram illustrating a factor optimization lookup table identifying for each traffic factor a gateway having a most optimal traffic measurement according to an embodiment of the present disclosure. The wireless network gateway sink nomination system in an embodiment may generate a factor optimization lookup table 500, as shown in FIG. 5, based on analysis of the normalized factor matrix described above with reference to FIG. 4. As shown in FIG. 5, the wireless network gateway sink nomination system in an embodiment may identify within the factor optimization lookup table 500 the gateway device within the network having the best normalized value for each traffic factor, and may identify such normalized value.

For example, the factor optimization lookup table 500 in an embodiment may identify gateway 3 as the gateway having the lowest normalized value of 5 ms with respect to cost. As another example, the factor optimization lookup table 500 in an embodiment may identify gateway 2 as the gateway having the highest normalized value of 200 kbit/s with respect to data rate. As another example, the factor optimization lookup table 500 in an embodiment may identify gateway 1 as the gateway having the lowest normalized value of 2 hops with respect to the number of hops. As another example, the factor optimization lookup table 500 in an embodiment may identify gateway 2 as the gateway having the best normalized value of −40 dBm with respect to RSSI. As another example, the factor optimization lookup table 500 in an embodiment may identify gateway 3 as the gateway having the lowest normalized value of 10 ms with respect to latency. As yet another example, the factor optimization lookup table 500 in an embodiment may identify gateway N as the gateway having the lowest normalized value of 1% with respect to lost packets.

Figure 6:
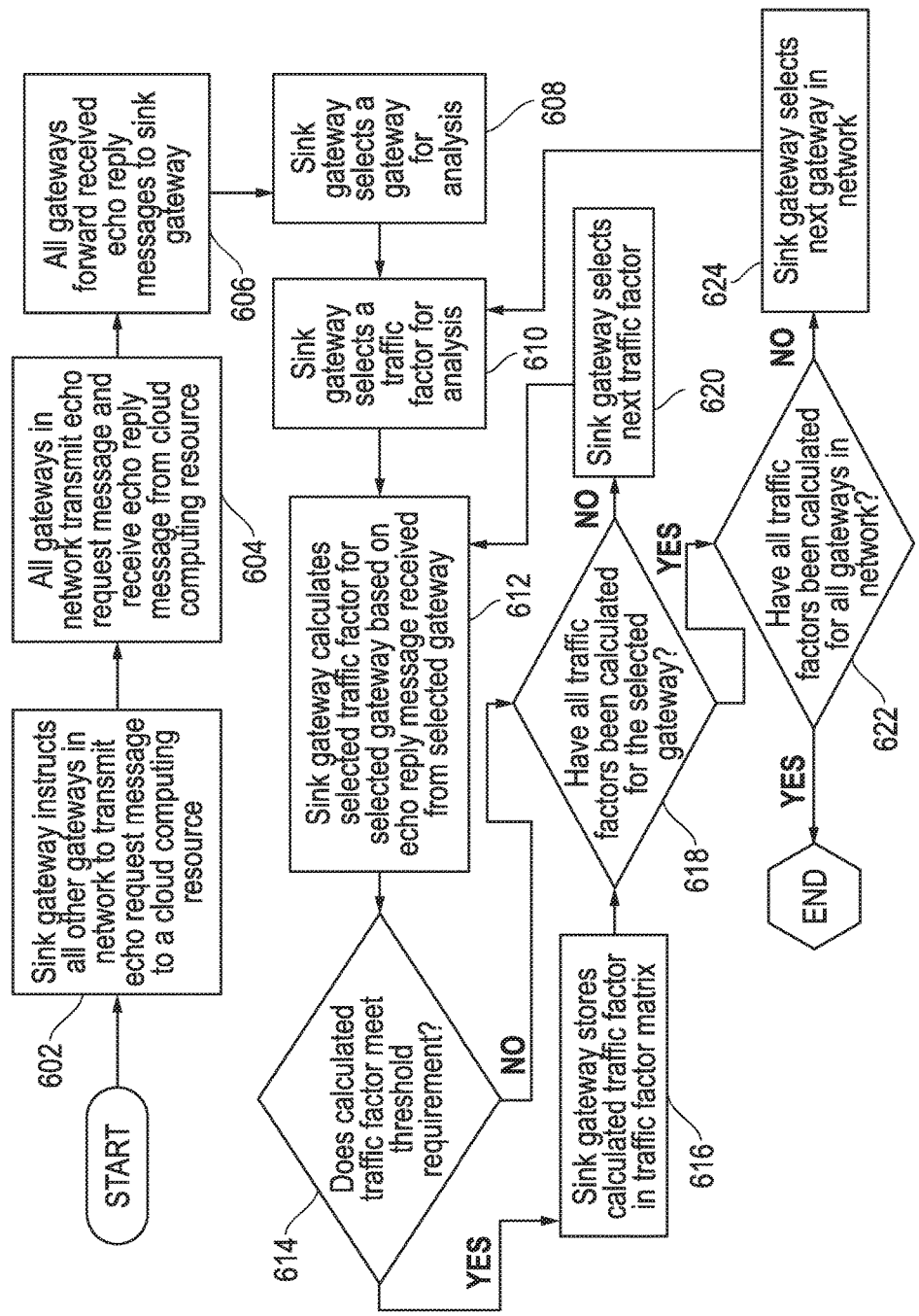
FIG. 6 is a flow diagram illustrating a method of populating a traffic factor matrix according to an embodiment of the present disclosure.

FIG. 6 is a flow diagram illustrating a method of populating a traffic factor matrix with a traffic factor value associated with each traffic factor and each gateway according to an embodiment of the present disclosure. As shown in FIG. 6, at block 602 in an embodiment a gateway device currently designated as the sink gateway for the network may instruct all other gateways in the network to transmit an echo request ICMP message to the same cloud computing resource. In an example embodiment, a network may include gateways 1-N, with gateway 1 currently designated as a sink gateway for the entire network. A wireless network gateway sink nomination system operating at gateway 1 in such an embodiment may perform all tasks relating to the currently designated sink gateway 1.

As described above, several traffic factors may be calculated based on a received echo reply ICMP message in order to characterize the flow of traffic between each gateway and a cloud computing resource. Although block 602 and the remainder of the method described by the blocks in FIG. 6 discuss transmission of an echo request ICMP message and an echo reply ICMP message, any type of broadcast message may be transmitted and received by each gateway, so long as the return receipt of the broadcast message allows for calculation of one or more traffic factors associated with the transmission and receipt of the broadcast message.

At block 604, in an embodiment, all gateways in the network, including the currently designated sink gateway may transmit an echo request ICMP message and receive an echo reply message from the same cloud computing resource. Each of the gateways may communicate with the same cloud computing resource at block 604 in order to compare each gateway's efficiency of communication with a single cloud computing resource. For example, the currently designated sink gateway 1, and gateways 2-N in an embodiment may each transmit an echo request ICMP message and may each receive an echo reply message from the same cloud computing resource. Each of the echo reply messages may vary from one another based on the traffic factors associated with the communication between the cloud computing resource and each of the gateways in the network, respectively.

At block 606, in an embodiment, all gateways, other than the currently designated sink gateway may forward each of their received echo reply ICMP messages to the currently designated sink gateway. In one embodiment, the currently designated sink gateway may be tasked with generating a factor matrix based on each of these received echo reply ICMP messages, as described above. For example, the currently designated sink gateway 1 may be tasked with generating a factor matrix based on each of the received echo reply ICMP messages forwarded to it from gateways 2-N. In such an embodiment, the currently designated sink gateway 1 may have been chosen by analysis of a plurality of traffic factors measured across all gateways in the network, as described in greater detail below. Alternatively, the currently designated sink gateway 1 in such an embodiment may have been randomly assigned prior to a first analysis of a plurality of traffic factors measured across all gateways 1-N in the network. In other embodiments, two or more of the gateways in the network may individually generate traffic factor matrices. In such an embodiment, there may not be a currently designated sink gateway, and each gateway in the network may forward their received echo reply ICMP messages to all other gateways in the network.

At block 608, in an embodiment, the currently designated sink gateway may select a gateway for analysis. In an embodiment, the currently designated sink gateway may be tasked with generating a factor matrix that stores traffic factors for each gateway in the network. As a consequence, the currently designated sink gateway may calculate traffic factors for one gateway at a time until the entire matrix is completely populated. For example, the currently designated sink gateway 1 at block 608 may select gateway 2 for analysis. In order to completely populate the factor matrix, the currently designated sink gateway may also calculate traffic factor values with respect to itself. As a consequence, in an example embodiment the currently designated sink gateway 1 may select gateway 1 for analysis at block 608.

At block 610, in an embodiment, the currently designated sink gateway may select a traffic factor for analysis. In an embodiment, the currently designated sink gateway may be tasked with generating a factor matrix that stores a traffic factor measurement for each traffic factor for each gateway in the network. As a consequence, the currently designated sink gateway may calculate a traffic factor value for one traffic factor at a time until all traffic factors for a given gateway in the network are calculated and stored in the factor matrix. For example, the currently designated sink gateway 1 at block 610 in an embodiment may select the data rate traffic factor for analysis. As another example, the currently designated sink gateway 1 at block 610 may select the hops traffic factor for analysis.

At block 612, in an embodiment, the currently designated sink gateway may calculate the selected traffic factor for the selected gateway based on the echo reply message received from the selected gateway. In an embodiment, the echo reply ICMP message may be used to calculate a plurality of traffic factors characterizing communication between a gateway device and a cloud computing resource, including, but not limited to cost, data rate, number of hops, RSSI, latency, and number of lost packets. For example, at block 612, the sink gateway 1 in an embodiment may calculate a data rate of 40 kbit/s associated with communication between the cloud computing resource and gateway 2 based on the echo reply ICMP message received by gateway 2 from the cloud computing resource and forwarded to the sink gateway 1 from gateway 2 at block 606. As another example, at block 612, the sink gateway 1 in an embodiment may determine the communication between the cloud computing resource and gateway 2 required 9 hops based on the echo reply ICMP message received by gateway 2 from the cloud computing resource and forwarded to the sink gateway 1 from gateway 2 at block 606.

At block 614, in an embodiment, the currently designated sink gateway may determine whether the traffic factor calculated at block 612 meets a threshold requirement for that traffic factor. Each traffic factor to be calculated may have a threshold requirement that limits a gateway's eligibility for selection as a most efficient gateway with respect to that traffic factor. As described in greater detail below, each gateway associated with a highest score with respect to a traffic factor will later be considered for selection as the future sink gateway. If each of the gateways in a network are associated with a highly inefficient measurement of the same traffic factor (e.g. data rate), the gateway associated with the best measurement (e.g. highest data rate) for that traffic factor should not be later considered for selection as a sink gateway, even though it has the best measurement, because the best measurement for that traffic factor does not meet basic functionality requirements. Thus, any traffic factor measurement that does not meet a preset basic threshold requirement in an embodiment may not be included in the factor matrix, and this may prohibit selection of the gateway associated with that traffic factor as the sink gateway based solely on that measurement.

In an example embodiment, the cost traffic factor may have a threshold requirement of 32 ms, the data rate traffic factor may have a threshold requirement of greater than 20 kbit/s, the number of hops may have a threshold requirement of fewer than 7 hops, the RSSI traffic factor may have a threshold requirement of greater than −80 dBm, the latency traffic factor may have a requirement of less than 50 ms, and the number of lost packets traffic factor may have a threshold requirement of less than five percent. If the calculated traffic factor in an embodiment meets the threshold requirement, the method may proceed to block 616. For example, the currently designated sink gateway 1 in an embodiment may determine the data rate of 40 kbit/s associated with gateway 2 is greater than the threshold requirement of 20 kbit/s for the data rate traffic factor, and the method may proceed to block 616.

If the calculated traffic factor in an embodiment does not meet the threshold requirement, the method may proceed to block 618. In some embodiments, the calculated traffic factor in an embodiment does not meet the threshold requirement, the currently designated sink gateway may store an indication within the factor matrix that the traffic factor has been calculated, but that it did not meet the threshold requirements. For example, in another embodiment, the currently designated sink gateway 1 in an embodiment may determine that the 9 hops associated with gateway 2 is not less than the threshold requirement of 7 hops, and the method may proceed to block 618. The currently designated sink gateway 1 in such an embodiment may also store an indication within the factor matrix indicating gateway 1 has calculated the number of hops for gateway 2, but that the measurement value did not meet the threshold requirement of fewer than 7 hops.

At block 616, the currently designated sink gateway may store the calculated traffic factor in the factor matrix. Once the currently designated sink gateway determines at block 614 that the traffic factor calculated at block 612 meets the threshold requirement for that traffic factor, the currently designated sink gateway in an embodiment may store that calculated traffic factor in the factor matrix described above. By storing the calculated traffic factor in the factor matrix, the currently designated sink gateway makes the gateway associated with the calculated traffic factor matrix eligible for selection as the most efficient gateway with respect to that traffic factor, and also for selection as the future designated sink gateway. For example, the currently designated sink gateway 1 in an embodiment may calculate the data rate traffic factor for gateway 2 is 40 kbit/s, determine this data rate exceeds the minimum threshold requirement of 20 kbit/s, and store the 40 kbit/s value in the factor matrix in the cell associated with gateway 2 and data rate. By doing so, the currently designated sink gateway 1 in an embodiment may make gateway 2 eligible for selection as the gateway having the most efficient data rate, and also makes gateway 2 eligible for selection as the next sink gateway.

At block 618, the currently designated sink gateway may determine whether all traffic factors have been calculated for the selected gateway. In an embodiment, the currently designated sink gateway may be tasked with fully populating the factor matrix, which may require the currently designated sink gateway to determine whether all traffic factor cells for the selected gateway have been populated. The currently designated sink gateway in an embodiment may make this determination whether or not the most recently calculated traffic factor has met the threshold requirement for that factor and consequently been stored in the factor matrix. For example, the sink gateway 1 in an embodiment may determine at block 618 whether all traffic factors have been calculated for gateway 2 immediately after determining that the 9 hops associated with gateway 2 did not meet the threshold requirement of fewer than 7 hops. As another example, the sink gateway 1 in another embodiment may determine at block 618 whether all traffic factors have been calculated for gateway 2 immediately after storing the 40 kbit/s data rate associated with gateway 2 in the factor matrix. In both of these embodiments, at block 618, the currently designated sink gateway 1 may determine whether the other traffic factors of cost, RSSI, latency, and packet loss have also been calculated for gateway 2.

If the currently designated sink gateway in an embodiment determines all traffic factors for the selected gateway have not been calculated, the method may proceed to block 620. As described above, if one of these factors has been calculated, but the calculated value did not meet the threshold, the sink gateway in such an embodiment may store an indication within the factor matrix that such traffic factor has been calculated, but was not stored in the factor matrix because it did not meet the threshold value. If the currently designated sink gateway in an embodiment determines all traffic factors for the currently selected gateway have been calculated and either had their values stored in the factor matrix, or the calculation resulted in placement of an indicator within the factor matrix that the measurement did not meet the threshold requirement, the method may proceed to block 622.

At block 620, in an embodiment, the currently designated sink gateway may select a next traffic factor of the selected gateway for analysis. For example, if the currently designated sink gateway 1 determines at block 618 that cost, data rate, and hops have been calculated for gateway 2, but that RSSI, latency, and lost packets have not been calculated for gateway 2, it may select RSSI as the next traffic factor for analysis. After selecting a next traffic factor for the currently selected gateway for analysis at block 620, the method may return to block 612 for calculation of the next traffic factor value for the selected gateway, determination whether that calculated traffic factor value meets its threshold requirement at block 614, and if so, storage of that calculated traffic factor value in the factor matrix at block 616. This loop may repeat until the currently designated sink gateway in an embodiment determines at block 618 that each of the traffic factors associated with the selected gateway have been calculated, and that either those measurements have been stored in the factor matrix, or that indications that those traffic factors have been calculated but did not meet their threshold requirements have been stored in the factor matrix, as described above.

At block 622, once the currently designated sink gateway in an embodiment determines all traffic factors for the currently selected gateway have been calculated, it may determine whether all traffic factors for all gateways in the network have been calculated. For example, once the currently designated sink gateway 1 in an embodiment determines at block 618 that all traffic factors have been calculated for gateway 2, it may determine at block 622 whether all traffic factors have been calculated for gateway 1, and gateways 3-N. If the currently designated sink gateway in an embodiment determines all traffic factors have been calculated for all gateways in the network, the method may end. If the currently designated sink gateway in an embodiment determines all traffic factors for all gateways in the network have not been calculated, the method may proceed to block 624.

At block 624, in an embodiment, the currently designated sink gateway may select a next gateway in the network for analysis. Once the currently designated sink gateway in an embodiment determines at block 618 that all of the traffic factors associated with a first gateway have been calculated, and thus, that all of the traffic factor cells associated with the first gateway in the factor matrix have been populated, the currently designated sink gateway may move on to populate the traffic factor cells associated with other gateways. For example, if the sink gateway 1 in an embodiment determines at block 618 that all traffic factors associated with gateway 2 have been calculated, it may select gateway 3 for analysis at block 624. Upon selection of the next gateway for analysis at block 624, the method may loop back to block 610, where the currently selected sink gateway may populate the cells of the factor matrix associated with the gateway selected at block 624 and each of the traffic factors. Once the entire factor matrix is populated with a calculated value for each traffic factor associated with each gateway, or with a notification that such calculated value did not meet the threshold requirement, the currently designated sink gateway may determine at block 622 that all traffic factors have been calculated for all gateways in the network, and the method may end.

Figure 7:
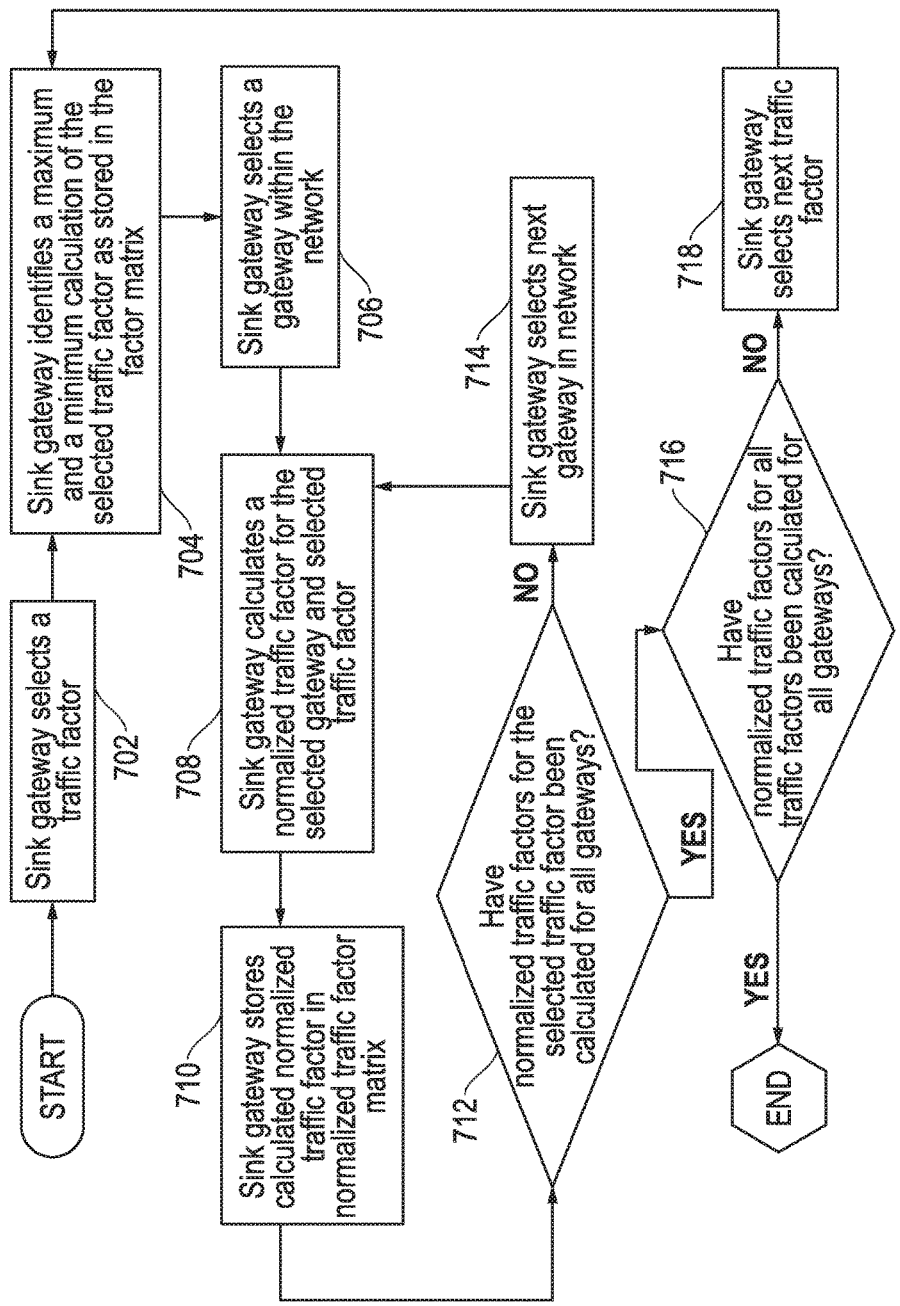
FIG. 7 is a flow diagram illustrating a method of populating a normalized traffic factor matrix according to an embodiment of the present disclosure.

FIG. 7 is a flow diagram illustrating a method of populating a normalized traffic factor matrix with a normalized traffic factor value associated with each traffic factor and each gateway according to an embodiment of the present disclosure. As described above with respect to FIG. 4, a wireless network gateway sink nomination system in an embodiment may generate a normalized factor matrix by normalizing the measured traffic factors stored in a factor matrix, such as the factor matrix generated via the method described directly above with respect to FIG. 6. Normalizing the traffic factor values across all gateways in an embodiment may make comparisons of each gateway's traffic factors more accurate in assessing a most efficient gateway.

In an example embodiment, a network may include gateways 1-N, with gateway 1 currently designated as a sink gateway for the entire network. A wireless network gateway sink nomination system operating at gateway 1 in such an embodiment may perform all tasks relating to the currently designated sink gateway 1, including storage of a factor matrix. In other embodiments, more than one gateway within the network may have access to the stored factor matrix, and may perform each of the method steps shown in FIG. 7.

At block 702, in an embodiment the currently designated sink gateway may select a traffic factor for normalization. The currently designated sink gateway in an embodiment may be tasked with populating the normalized traffic factor matrix by calculating normalized values for each traffic factor for each gateway. As a consequence, the currently designated sink gateway may select one traffic factor to normalize at a time for a selected gateway until all of the traffic factors for that selected gateway are normalized and stored in the normalized traffic factor matrix. For example, the currently designated sink gateway 1 at block 702 in an embodiment may select the data rate traffic factor for analysis. In another example embodiment, the currently designated sink gateway 1 at block 702 in an embodiment may select the RSSI traffic factor for analysis.

At block 704, in an embodiment the currently designated sink gateway may identify a maximum and a minimum calculated value for the selected traffic factor, and/or identify the scale of calculated values for a selected traffic factor across all gateways. For example, the currently designated sink gateway in an embodiment may access the factor matrix described in greater detail above, and determine the maximum calculated and stored value for the data rate traffic factor is associated with gateway 2, and has a value $DR_{GW2}$, and the minimum calculated and stored value for the data rate traffic factor is associated with gateway N, and has a value $DR_{GWN}$. In another example, the currently designated sink gateway in an embodiment may access the factor matrix described in greater detail above, and identify the scale of calculated values for the data rate traffic factor across all gateways as $DR_{GW2}$-$DR_{GWN}$. As another example, the currently designated sink gateway in an embodiment may access the factor matrix described in greater detail above, and determine the maximum calculated and stored value for the RSSI traffic factor is associated with gateway N, and has a value $RSSI_{GWN}$, and the minimum calculated and stored value for the data rate traffic factor is associated with gateway 2, and has a value $RSSI_{GW2}$. In another example, the currently designated sink gateway in an embodiment may access the factor matrix described in greater detail above, and identify the scale of calculated values for the data rate traffic factor across all gateways as $RSSI_{GWN}$-$RSSI_{GW2}$. At block 704, the currently designated sink gateway may not consider notifications indicating a calculation did not meet a threshold requirement as part of the calculation of the maximum, minimum, or scale of calculations for any given traffic factor. In such a way, the currently designated sink gateway may avoid skewing measured results that take into account gateways performing under threshold expectations.

At block 706, in an embodiment the currently designated sink gateway may select a gateway for normalization of its calculated traffic factors. The currently designated sink gateway in an embodiment may be tasked with populating the normalized traffic factor matrix by calculating normalized values for each traffic factor for each gateway. As a consequence, the currently designated sink gateway may calculate normalized traffic factors for one gateway at a time until the entire matrix is complete. For example, the currently designated sink gateway 1 at block 706 may select gateway 2 for analysis. In order to completely populate the normalized traffic factor matrix, the currently designated sink gateway may also calculate traffic factor values with respect to itself. As a consequence, in an example embodiment the currently designated sink gateway 1 may select gateway 1 for analysis at block 706.

At block 708, in an embodiment, the currently designated sink gateway may calculate a normalized traffic factor for the selected gateway and the selected traffic factor. In an embodiment, the currently designated sink gateway may access the factor matrix described in greater detail above, select a particular cell storing a calculated traffic factor value for the selected gateway and the selected traffic factor, and apply a normalization equation to the calculated and stored value. The wireless network gateway sink nomination system operating at a currently designated sink gateway in an embodiment may use one of various types of normalization formulas that function to make each normalized traffic factor scale invariant when generating the normalized factor matrix, as described in greater detail above. As one example, a feature scaling calculation may follow the formula:

$$X' = \frac{X - X_{MIN}}{X_{MAX} - X_{MIN}}$$

In an embodiment where the currently designated sink gateway 1 selects the traffic factor RSSI and gateway 2 for analysis and applies the feature scaling calculation normalization technique, at block 708 the sink gateway 1 may calculate the normalized RSSI value for gateway 2 as follows:

$$RSSI_{GW2NORM} = \frac{RSSI_{GW2} - RSSI_{MIN}}{RSSI_{MAX} - RSSI_{Threshold}}$$

This normalization formula in an embodiment may make the calculated value of the calculated RSSI factor for gateway 2 scale-invariant by dividing the difference between the calculated RSSI for gateway 2 and the minimum calculated value for RSSI across all gateways by the scale of calculated values for RSSI across all gateways (e.g. the maximum calculated RSSI minus the minimum calculated RSSI). In another embodiment where the currently designated sink gateway 1 selects the latency traffic factor and gateway 2 for analysis and applies the feature scaling calculation normalization technique, at block 708, the sink gateway 1 may calculate the normalized latency value for gateway 2 as follows:

$$LAT_{GW2NORM} = \frac{LAT_{GW2} - LAT_{MIN}}{LAT_{Threshold} - LAT_{MIN}}$$

As described above, the threshold requirement for a traffic factor may act as the defined maximum, or as the defined minimum, dependent upon whether the threshold requires values in excess or less than the threshold requirement. For example, because the RSSI threshold requirement is greater than −80 dBm, this threshold value in an embodiment may act as a defined minimum within the normalization calculation. As another example, because the latency threshold requirement is less than 50 ms, this threshold value in an embodiment may act as a defined maximum within the normalization calculation. In other embodiments, the threshold value may not define a maximum or a minimum, and only calculated values may be used to determine maximum, minimum, and scale.

At block 710, in an embodiment, the currently designated sink gateway may store the calculated normalized traffic factor value in the normalized traffic factor matrix. For example, in an embodiment where the currently designated sink gateway 1 selects the traffic factor RSSI and gateway 2 for analysis and applies the feature scaling calculation normalization technique, at block 708 the sink gateway 1 may store the normalized RSSI value $RSSI_{GW2NORM}$ within the normalized traffic factor matrix in the cell associated with both the RSSI traffic factor value and gateway 2. As another example embodiment where the currently designated sink gateway 1 selects the latency traffic factor and gateway 2 for analysis and applies the feature scaling calculation normalization technique, at block 708, the sink gateway 1 may store the normalize latency value $LAT_{GW2NORM}$ within the normalized traffic factor matrix in the cell associated with both the latency traffic factor and gateway 2.

If the cell associated with the selected gateway and selected traffic factor within the factor matrix indicates the traffic factor calculation did not meet the threshold requirement, the currently designated sink gateway may store a similar notification in the cell of the normalized traffic factor matrix associated with the selected gateway and the selected traffic factor. For example, in an embodiment where the currently designated sink gateway 1 selects RSSI as the traffic factor for analysis and selects itself for analysis, gateway 1 may access the factor matrix, identify a notification within the factor matrix at the cell associated with RSSI and gateway 1 indicating the RSSI measurement for gateway 1 did not meet the threshold requirement of greater than −80 dBm, and may store a similar notification within the cell in the normalized traffic factor matrix associated with gateway 1 and the RSSI traffic factor.

At block 712, the currently designated sink gateway may determine whether normalized traffic factors for the selected traffic factor have been calculated for all gateways. For example, a currently designated sink gateway 1 in an embodiment may determine at block 712 that the RSSI traffic factor calculations associated with gateways 1-N have been normalized and stored in the normalized traffic factor matrix, and that consequently, all of the cells associated with the RSSI traffic factor have been populated within the normalized traffic factor matrix. If the currently designated sink gateway determines normalized traffic factor values for the selected traffic factor have been calculated and stored for each gateway in the network, the method may proceed to block 716.

As another example, a currently designated sink gateway 1 in an embodiment may determine at block 712 that the latency traffic factor calculations associated with gateways 1 and 2 have been normalized and stored in the normalized traffic factor matrix, but that latency traffic factors associated with gateways 3-N have not been normalized and stored. The currently designated sink gateway 1 in such an embodiment may consequently determine further steps may be needed in order to fully populate the normalized traffic factor matrix. If the currently designated sink gateway determines normalized traffic factor values for the selected traffic factor have not been calculated and stored for each gateway in the network, the method may proceed to block 714.

At block 714 in an embodiment, the currently designated sink gateway may select the next gateway in the network for analysis. For example, as described directly above, in an embodiment where the sink gateway 1 at block 710 stores the calculated normalized latency value for selected gateway 2 ($LAT_{GW2NORM}$) in the normalized traffic factor matrix, then determines the latency traffic factors associated with gateways 3-N have not been normalized, the sink gateway 1 at block 714 may select gateway 3 as a next gateway for analysis. Upon selection of the next gateway in the network for analysis, the method may loop back to blocks 708-712, and the currently designated sink gateway may calculate the normalized value for the selected traffic factor for another gateway in each loop until the calculated values for the selected traffic factor for all gateways in the network have been normalized and all cells associated with the selected traffic factor within the normalized traffic factor matrix have been populated.

At block 716, a currently designated sink gateway in an embodiment may determine whether the traffic factor values for all traffic factors for all gateways have been normalized. For example, a currently designated sink gateway 1 in an embodiment may determine at block 712 that the RSSI traffic factor calculations associated with gateways 1-N have been normalized and stored in the normalized traffic factor matrix, but determine at block 716 that the lost packets traffic factor calculations for each of the gateways 1-N have not been normalized. If the currently designated sink gateway 1 in an embodiment determines at block 712 that all traffic factors for all gateways have not been normalized and stored in the normalized traffic factor matrix, the method may proceed to block 718.

As another example, a currently designated sink gateway 1 in an embodiment may determine at block 712 that the lost packets traffic factor calculations associated with gateways 1-N have been normalized and stored in the normalized traffic factor matrix, and that the calculations for all other traffic factors for all other gateways have also been normalized and stored in the normalized traffic factor matrix. If the currently designated sink gateway 1 in an embodiment determines at block 712 that all traffic factors for all gateways have been normalized and stored in the normalized traffic factor matrix, the method may end.

At block 718 in an embodiment, a currently designated sink gateway in an embodiment may select a next traffic factor for analysis. For example, as described directly above, in an embodiment where the sink gateway 1 at block 716 determines that the lost packets traffic factor calculations for each of the gateways 1-N have not been normalized, the sink gateway 1 at block 718 may select the lost packets traffic factor as a next traffic factor for analysis. Upon selection of the next traffic factor for analysis, the method may loop back to blocks 704-716, and the currently designated sink gateway may calculate the normalized value for the selected traffic factor for all gateways in each loop until the calculated values for all traffic factors for all gateways in the network have been normalized and all cells within the normalized traffic factor matrix have been populated.

Figure 8:
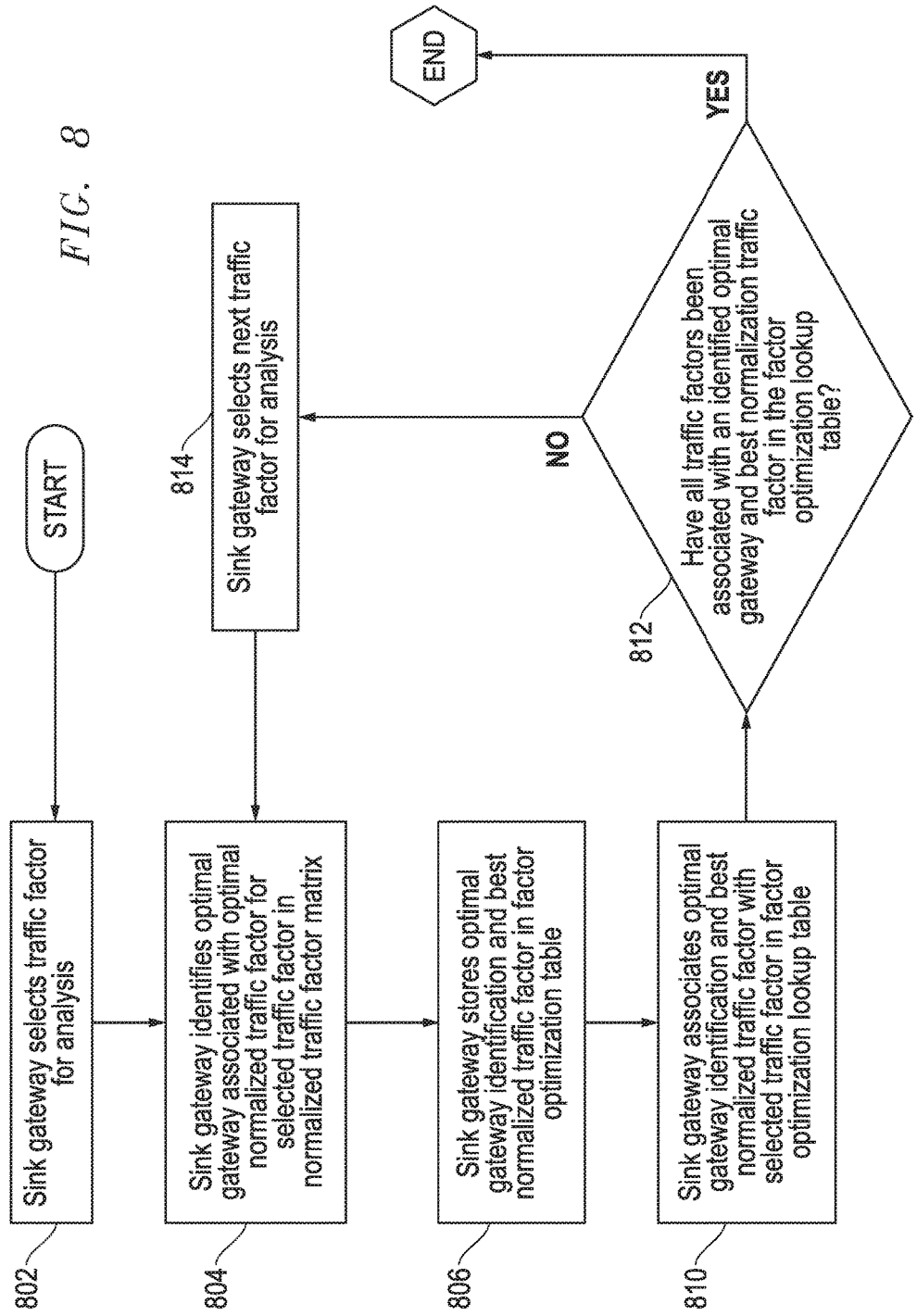
FIG. 8 is a flow diagram illustrating a method of populating a factor optimization lookup table according to an embodiment of the present disclosure.

FIG. 8 is a flow diagram illustrating a method of populating a factor optimization lookup table associating each traffic factor with a gateway having the most optimal measurements with respect to that traffic factor according to an embodiment of the present disclosure. As described above with respect to FIG. 5, the wireless network gateway sink nomination system in an embodiment may identify within the factor optimization lookup table the gateway device within the network having the best normalized value for each traffic factor, and may identify such normalized value. In an example embodiment, a network may include gateways 1-N, with gateway 1 currently designated as a sink gateway for the entire network. A wireless network gateway sink nomination system operating at gateway 1 in such an embodiment may perform all tasks relating to the currently designated sink gateway 1, including population of the factor optimization lookup table. In other embodiments, more than one gateway within the network may have access to the stored normalized traffic factor matrix, and may perform each of the method steps shown in FIG. 8.

As shown in FIG. 8, at block 802 in an embodiment, a currently designated sink gateway may select a traffic factor for analysis. For example, a currently designated sink gateway 1 in an embodiment may select the data rate traffic factor for analysis at block 802. As another example, a currently designated sink gateway 1 in an embodiment may select the latency traffic factor for analysis at block 802.

At block 804, in an embodiment, a currently designated sink gateway may access the normalized traffic factor matrix and identify an optimal gateway associated with an optimal normalized traffic factor for the selected traffic factor. For example, a currently designated sink gateway 1 in an embodiment may access the normalized traffic factor matrix described in greater detail above and identify gateway 2 as an optimal gateway associated with the data rate traffic factor. This may occur because the non-normalized calculated data rate value for gateway 2 as stored in the factor matrix in an embodiment is the maximum calculated value, and higher data rates are considered more efficient than lower data rates (as reflected by the fact that the threshold requirement for data rates is above a minimum value of 20 kbit/s).

As another example, a currently designated sink gateway 1 in an embodiment may access the normalized traffic factor matrix and identify gateway 3 as an optimal gateway associated with the latency traffic factor. This may occur because the non-normalized calculated latency value for gateway 3 as stored in the factor matrix in an embodiment is the minimum calculated value, and lower latency measurements are considered more efficient than higher latency measurements (as reflected by the fact that the threshold requirement for data rates is below a maximum of 50 ms).

At block 806 in an embodiment, a currently designated sink gateway may store the optimal gateway identification and best normalized traffic factor in the factor optimization lookup table. For example, in an embodiment where a currently designated sink gateway 1 identifies gateway 2 as an optimal gateway associated with the data rate traffic factor, it may store an identification of gateway 2 and the value of the data rate traffic factor for gateway 2, $DR_{GW2}$ within the factor optimization lookup table. As another example, in an embodiment where a currently designated sink gateway 1 identifies gateway 3 as an optimal gateway associated with the latency traffic factor, it may store an identification of gateway 3 and the value of the latency traffic factor for gateway 3, $LAT_{GW3}$ within the factor optimization lookup table.

At block 808, in an embodiment, a currently designated sink gateway may associate the stored optimal gateway identification and best normalized traffic factor in the factor optimization lookup table with the selected traffic factor. For example, in an embodiment where the currently designated sink gateway 1 selects the data rate traffic factor at block 802, and stores an identification of gateway 2 and the value of the data rate traffic factor for gateway 2, $DR_{GW2}$ within the factor optimization lookup table at block 806, the currently designated sink gateway 1 at block 808 may associate the identification of gateway 2 and the value $DR_{GW2}$ with the selected data rate factor within the factor optimization lookup table at block 810. As another example, in an embodiment where the currently designated sink gateway 1 selects the latency traffic factor at block 802, and stores an identification of gateway 3 and the value of the latency traffic factor for gateway 3, $LAT_{GW3}$ within the factor optimization lookup table at block 806, the currently designated sink gateway 1 at block 808 may associate the identification of gateway 3 and the value $LAT_{GW3}$ with the selected latency factor within the factor optimization lookup table at block 810.

At block 812, in an embodiment, a currently designated sink gateway may determine whether all traffic factors have been associated with an identified optimal gateway and best normalization traffic factor in the factor optimization lookup table. The currently designated sink gateway in an embodiment may be tasked with fully populating the factor optimization lookup table. A determination that all traffic factors have not been associated with an identified optimal gateway and highest normalization traffic factor in the factor optimization lookup table in an embodiment may indicate the factor optimization lookup table has not been fully populated and more steps are required.

For example, if the currently designated sink gateway 1 in an embodiment determines the cost, data rate, hops, and RSSI traffic factors have been associated with an identified optimal gateway and a best normalization traffic factor, but the latency traffic factor has not, it may indicate the factor optimization lookup table is not yet fully populated. As a consequence, if the currently designated sink gateway in an embodiment determines not all traffic factors have been associated with an identified optimal gateway and a best normalization traffic factor, the method may proceed to block 814.

As another example, if the currently designated sink gateway 1 in an embodiment determines each of the traffic factors have been associated with an identified optimal gateway and a best normalization traffic factor, it may indicate the factor optimization lookup table is fully populated. As a consequence, if the currently designated sink gateway in an embodiment determines all traffic factors have been associated with an identified optimal gateway and a best normalization traffic factor, the method may end.

At block 814, in an embodiment, a currently designated sink gateway may select a next traffic factor for analysis. For example, if the currently designated sink gateway 1 in an embodiment determines the cost, data rate, hops, and RSSI traffic factors have been associated with an identified optimal gateway and a best normalization traffic factor, but the latency traffic factor has not, the currently designated sink gateway 1 may select the latency traffic factor as the next traffic factor for analysis. Upon selection of the next traffic factor for analysis, the method may loop back to blocks 804-812 in order to identify and store in the factor optimization lookup table an optimal gateway and optimal value associated with every traffic factor until the factor optimization lookup table is fully populated.

Figure 9:
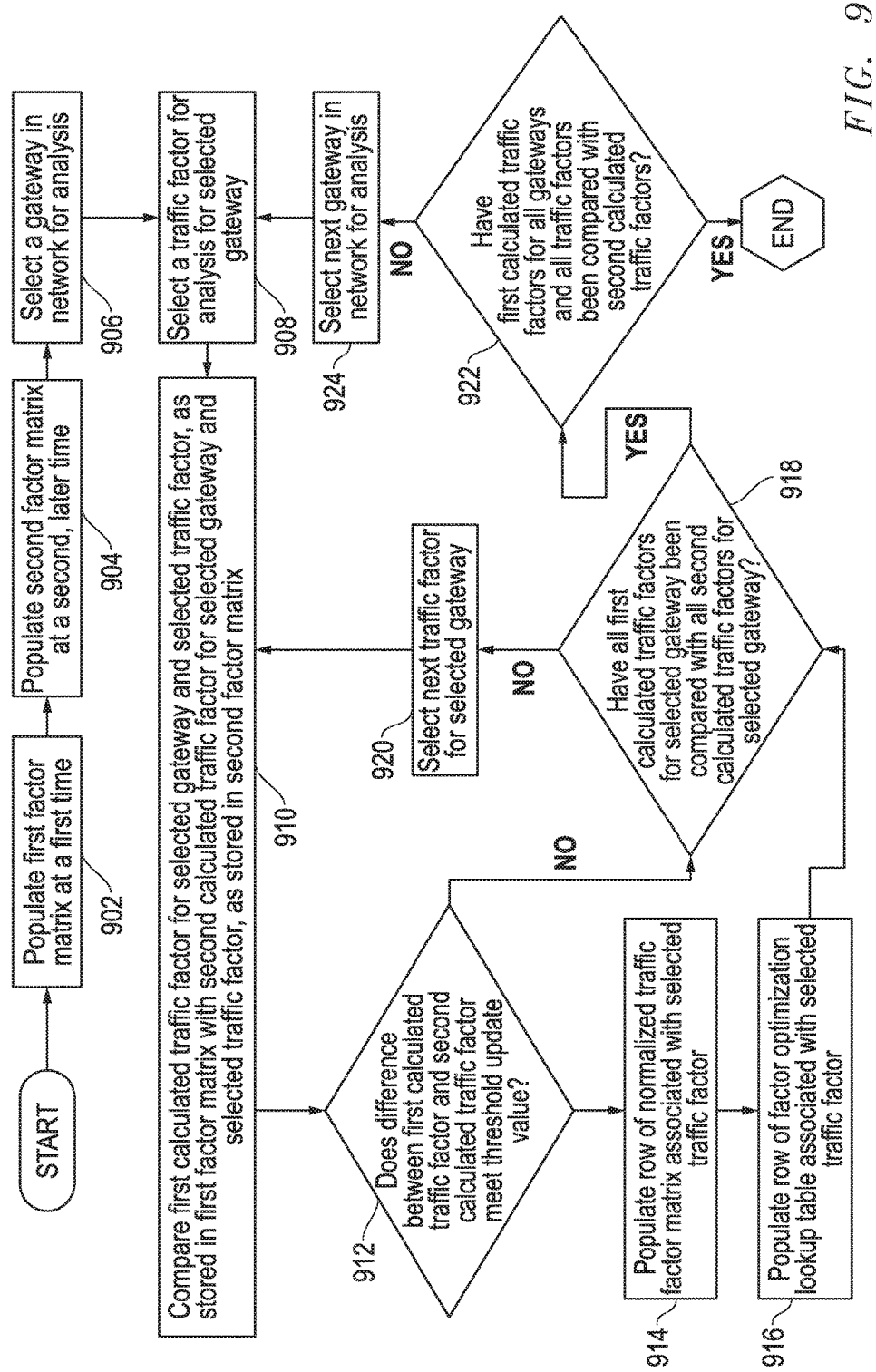
FIG. 9 is a flow diagram illustrating a method of updating a factor optimization lookup table according to an embodiment of the present disclosure.

FIG. 9 is a flow diagram illustrating a method of updating a factor optimization lookup table associating each traffic factor with a gateway having the most optimal measurements with respect to that traffic factor according to an embodiment of the present disclosure. The wireless network gateway sink nomination system in an embodiment of the present disclosure may flexibly designate a most efficient gateway as a sink for a wireless network by examining the efficiency of each gateway in a wireless network relating to a plurality of traffic factors, and by updating these efficiency measurements over time in order to dynamically adapt to changing traffic conditions within the network and the cloud. In an example embodiment, a network may include gateways 1-N, with gateway 1 currently designated as a sink gateway for the entire network. A wireless network gateway sink nomination system operating at gateway 1 in such an embodiment may perform all tasks relating to the currently designated sink gateway 1, including updating the factor optimization lookup table. In other embodiments, more than one gateway within the network may perform each of the method steps shown in FIG. 9.

At block 902, in an embodiment, a first factor matrix may be populated at a first time. For example, as described in greater detail above, a first factor matrix may be populated at a first time by calculating a plurality of traffic factors (e.g. cost, data rate, hops, RSSI, latency, and lost packets) across a plurality of gateways in a wireless network (e.g. gateways 1-N). The calculated plurality of traffic factors across the plurality of gateways in such an embodiment may be based on broadcast messages collected by all gateways and forwarded to a single currently designated sink gateway or to all gateways within the network at a first time.

At block 904, in an embodiment, a second factor matrix may be populated at a second, later time. For example, a second factor matrix may be populated at a second time by calculating the same plurality of traffic factors referenced at block 902 (e.g. cost, data rate, hops, RSSI, latency, and lost packets) across the same plurality of gateways in the wireless network referenced at block 2 (e.g. gateways 1-N) using the method described above with reference to FIG. 6. The calculated plurality of traffic factors across the plurality of gateways in such an embodiment may be based on broadcast messages collected by all gateways and forwarded to a single currently designated sink gateway or to all gateways within the network at a second time, occurring after the first time. In an embodiment, the wireless network gateway sink nomination system may repeat the update method of FIG. 9 repeatedly after a preset time duration elapses between the first time and the second time.

At block 906, in an embodiment a gateway may be selected for analysis. In an embodiment, the currently designated sink gateway may be tasked with updating the factor optimization lookup table if the calculated traffic factors for any of the gateways in the network have changed between the first and second times. As a consequence, the currently designated sink gateway may compare traffic factor values calculated at a first time with traffic factor values calculated at a second time for each gateway in the network until it is determined whether any of the calculated traffic factors for any of the gateways in the network have changed between the first and second times. For example, the currently designated sink gateway 1 at block 906 may select gateway 2 for analysis. In order to compare traffic factor values calculated at a first time with traffic factor values calculated at a second time for each gateway in the network, the currently designated sink gateway may also compare traffic factor values calculated at a first time with traffic factor values calculated at a second time with respect to itself. As a consequence, in an example embodiment the currently designated sink gateway 1 may select gateway 1 for analysis at block 906. If these values have changed, the determination of the most efficient gateway in the network may have also changed, and a designation of a new sink gateway may be needed.

At block 908, in an embodiment, a traffic factor for the selected gateway is selected for analysis. As described directly above, in an embodiment, the currently designated sink gateway may be tasked with updating the factor optimization lookup table if the calculated traffic factors for any of the gateways in the network have changed between the first and second times. As a consequence, the currently designated sink gateway may compare a traffic factor value for a first traffic factor calculated at a first time with a traffic factor value for the same traffic factor calculated at a second time for the selected gateway to determine whether the calculated traffic factors has changed between the first and second times. For example, the currently designated sink gateway 1 may select gateway 2 at block 906 and the data rate traffic factor for analysis at block 908. As another example, the currently designated sink gateway 1 may select gateway 1 at block 906 and the latency traffic factor for analysis at block 908.

At block 910, in an embodiment the first calculated value for the selected gateway and selected traffic factor, as stored in the first factor matrix may be compared with the second calculated value for the selected gateway and selected traffic factor, as stored in the second factor matrix. For example, the currently designated gateway 1 in an embodiment may identify within the first factor matrix a first calculated value of $DR_{GW2t1}$ for the selected gateway 2 and selected data rate traffic factor. The currently designated gateway 1 in such an embodiment may also identify within the second factor matrix a second calculated value of $DR_{GW2t2}$ for the selected gateway 2 and selected data rate traffic factor. At block 910, in an embodiment, the currently designated gateway 1 may compare the values $DR_{GW2t1}$ and $DR_{GW2t2}$.

At block 912, in an embodiment, it may be determined whether the difference between the first calculated value of the selected traffic factor and the second calculated value of the selected traffic factor meet a threshold update value. For example, in an embodiment where the currently designated gateway 1 selects gateway 2 at block 906, selects the data rate traffic factor at block 908, and compares the values $DR_{GW2t1}$ and $DR_{GW2t2}$ at block 910, the currently designated gateway 1 at block 912 may determine whether the difference between $DR_{GW2t1}$ and $DR_{GW2t2}$ meets a threshold update value. A threshold update value may be used in order to determine whether changes in the value of a traffic factor for a gateway over time are negligible, or are large enough to potentially impact selection of the most efficient gateway in the network to serve as the sink gateway. The threshold update value in an embodiment may be a preset static number, such as 10 kbit/s for data rate. In other embodiments, the threshold update value may be tied to earlier calculations for data rates, such as, for example, a 10% change in the average data rate most recently measured across all gateways, or a 5% change in the optimal data rate stored in the factor optimization lookup table.

If the difference between the first calculated value of the selected traffic factor and the second calculated value of the selected traffic factor does not meet the threshold update value, it may indicate no change or negligible change in the value of the selected traffic factor for the selected gateway, and the method may proceed to block 918. If the difference between the first calculated value of the selected traffic factor and the second calculated value of the selected traffic factor does meet the threshold update value, it may indicate a change in the value of the selected traffic factor for the selected gateway that may impact proper selection of the most efficient gateway in the network to serve as the sink gateway, and the method may proceed to block 914.

At block 914, in an embodiment, the row of the normalized traffic factor matrix associated with the selected traffic factor may be populated. As described directly above, if the difference between the first calculated value of the selected traffic factor and the second calculated value of the selected traffic factor does meet the threshold update value, it may indicate a change in the value of the selected traffic factor for the selected gateway that may impact proper selection of the most efficient gateway in the network to serve as the sink gateway. Consequently, a recalculation of the factor optimization lookup table, and in turn, the normalized traffic factor matrix upon which the factor optimization lookup table is based may need to be repopulated with updated calculations. For example, in an embodiment where the currently designated gateway 1 selects gateway 2 at block 906, selects the data rate traffic factor at block 908, compares the values $DR_{GW2t1}$ and $DR_{GW2t2}$ at block 910, and determines the difference between $DR_{GW2t1}$ and $DR_{GW2t2}$ meets the threshold update value at block 912, the currently designated gateway 1 in such an embodiment may repopulate the row of the normalized traffic factor matrix associated with the data rate traffic factor to account for the substantial change in calculations of those values over time. The currently designated gateway in an embodiment may repopulate a row of the normalized traffic factor matrix in an embodiment by following the method described with reference to blocks 702-712 in FIG. 7.

At block 916 in an embodiment, the row of the factor optimization lookup table associated with the selected traffic factor may be repopulated. As described directly above, the factor optimization lookup table may need to be repopulated with updated calculations in order to determine whether the currently designated sink gateway is still the most efficient gateway in the network to serve as the sink gateway, or whether the changes in traffic conditions have made another gateway more efficient. For example, in an embodiment where the currently designated gateway 1 selects gateway 2 at block 906, selects the data rate traffic factor at block 908, compares the values $DR_{GW2t1}$ and $DR_{GW2t2}$ at block 910, determines the difference between $DR_{GW2t1}$ and $DR_{GW2t2}$ meets the threshold update value at block 912, and repopulates the row of the normalized traffic factor matrix associated with the data rate traffic factor at block 914, the currently designated sink gateway 1 may repopulate the row of the factor optimization table associated with the data rate traffic factor to account for the substantial change in calculations of those values over time. In such an embodiment, the data rate for gateway 2 may have dropped significantly between the first and second times, and the change in the values $DR_{GW2t1}$ and $DR_{GW2t2}$ may have caused the currently designated sink gateway 1 to identify gateway 3 rather than gateway 2 as the gateway associated with the best data rate at the second time in the factor optimization lookup table. The currently designated gateway in an embodiment may repopulate a row of the factor optimization lookup table in an embodiment by following the method described with reference to blocks 802-812 in FIG. 8.

At block 918, in an embodiment, it may be determined whether all first calculated traffic factors for the selected gateway have been compared with all second calculated traffic factors for the selected gateway. In an embodiment, the currently designated sink gateway may be tasked with updating the factor optimization lookup table if any of the calculated traffic factors for any of the gateways in the network have changed significantly between the first and second times. This may require the currently designated sink gateway to determine whether the calculated values of any of the traffic factors for the selected gateway have changed between the first and second times.

The currently designated sink gateway in an embodiment may make this determination whether or not the values of the most recently selected traffic factor have changed negligibly or substantially. For example, the sink gateway 1 in an embodiment may determine at block 918 whether all first calculated traffic factors for gateway 2 have been compared with all second calculated traffic factors for gateway 2 immediately after determining at block 912 that the difference between data rate values $DR_{GW2t1}$ and $DR_{GW2t2}$ is negligible and does not meet the threshold update value. As another example, the sink gateway 1 in another embodiment may determine at block 918 whether all first calculated traffic factors for gateway 2 have been compared with all second calculated traffic factors for gateway 2 after determining at block 912 that the difference between data rate values $DR_{GW2t1}$ and $DR_{GW2t2}$ does meet the threshold update value, repopulating the row of the normalized traffic factor matrix associated with the data rate traffic factor at block 914, and repopulating the row of the factor optimization lookup table associated with data rate at block 916.

If the currently designated sink gateway in an embodiment determines at block 918 that all first calculated traffic factors for the selected gateway have been compared with all second calculated traffic factors for the selected gateway, the method may proceed to block 922. If the currently designated sink gateway in an embodiment determines at block 918 that all first calculated traffic factors for the selected gateway have not been compared with all second calculated traffic factors for the selected gateway, the method may proceed to block 920.

At block 920, in an embodiment, a next traffic factor for the selected gateway may be selected for analysis. As described above, in an embodiment, in order to determine whether the factor optimization lookup table needs to be updated, the currently designated sink gateway may need to determine whether the calculated values of any of the traffic factors for the selected gateway have changed between the first and second times. For example, the currently designated sink gateway 1 in an embodiment may determine at block 912 that the difference between data rate values $DR_{GW2t1}$ and $DR_{GW2t2}$ is negligible and does not meet the threshold update value, but may also determine that the first calculated values have not been compared to the second calculated values for all other traffic factors for gateway 2 at block 918. In such an embodiment, the designated sink gateway 1 may select the hops traffic factor for gateway 2 for analysis in order to determine if the first calculated value for gateway 2 hops, $Hops_{GW2t1}$ differs substantially from the second calculated value for gateway 2 hops, $Hops_{GW2t2}$. Even if the calculated values for gateway 2's data rates have not changed over time, the calculated values for gateway 2 hops or one of the other traffic factors may have changed over time. A change in any one of the traffic factors for gateway 2 over time may impact the determination of the best gateway in the network to serve as the sink gateway, as described in greater detail below.

As another example, the currently designated sink gateway 1 in an embodiment may determine at block 912 that the difference between data rate values $DR_{GW2t1}$ and $DR_{GW2t2}$ is meets the threshold update value and may update the row of the factor optimization lookup table associated with the data rate traffic factor at block 916, but may also determine that the first calculated values have not been compared to the second calculated values for all other traffic factors for gateway 2 at block 918. In such an embodiment, the designated sink gateway 1 may select the hops traffic factor for gateway 2 for analysis at block 920 in order to determine if the first calculated value for gateway 2 hops, $Hops_{GW2t1}$ differs substantially from the second calculated value for gateway 2 hops, $Hops_{GW2t2}$. Upon selection of the next traffic factor for the selected gateway for analysis at block 920 in an embodiment, the method may loop back to blocks 910-918 in order to update each row of the factor optimization lookup table associated with a traffic factor undergoing a significant change in calculated value for the selected gateway over time.

At block 922, in an embodiment it may be determined whether all first calculated traffic factors have been compared with all second calculated traffic factors for all of the gateways in the network. In an embodiment, the currently designated sink gateway may be tasked with updating the factor optimization lookup table if any of the calculated traffic factors for any of the gateways in the network have changed significantly between the first and second times. This may require the currently designated sink gateway to determine whether the calculated values of any of the traffic factors for the any of the gateways in the network have changed between the first and second times.

For example, in an embodiment, the currently designated sink gateway 1 may determine the first calculated values have been compared to the second calculated values for each traffic factor for gateways 1 and 2, but not for gateways 3-N. If the currently designated sink gateway in an embodiment determines the first calculated values have not been compared to the second calculated values for each traffic factor for all gateways in the network, the method may proceed to block 924. As another example, in an embodiment, the currently designated sink gateway 1 may determine the first calculated values have been compared to the second calculated values for each traffic factor for all gateways 1-N. If the currently designated sink gateway in an embodiment determines the first calculated values have been compared to the second calculated values for each traffic factor for all gateways in the network, the factor optimization lookup table may have been updated as needed, and the method may end.

At block 924, in an embodiment a next gateway may be selected for analysis. As described above, in an embodiment, the currently designated sink gateway may need to determine whether the calculated values of any of the traffic factors for the any of the gateways in the network have changed between the first and second times. If the currently designated sink gateway determines at block 922 that all first calculated values have not been compared against all second calculated values for each traffic factor for all gateways, the currently designated sink gateway in an embodiment may select a next gateway in the network for analysis at block 924. For example, if the currently designated sink gateway 1 in an embodiment determines the first calculated values have been compared to the second calculated values for each traffic factor for gateways 1 and 2, but not for gateways 3-N, the currently designated sink gateway 1 in an embodiment may select gateway 3 as a next gateway for analysis at block 924. Upon selecting the next gateway for analysis at block 924, the method may loop back to blocks 908-922, updating the factor optimization lookup table associated with a traffic factor undergoing a significant change in calculated value for the any of the gateways in the network over time.

Figure 10:
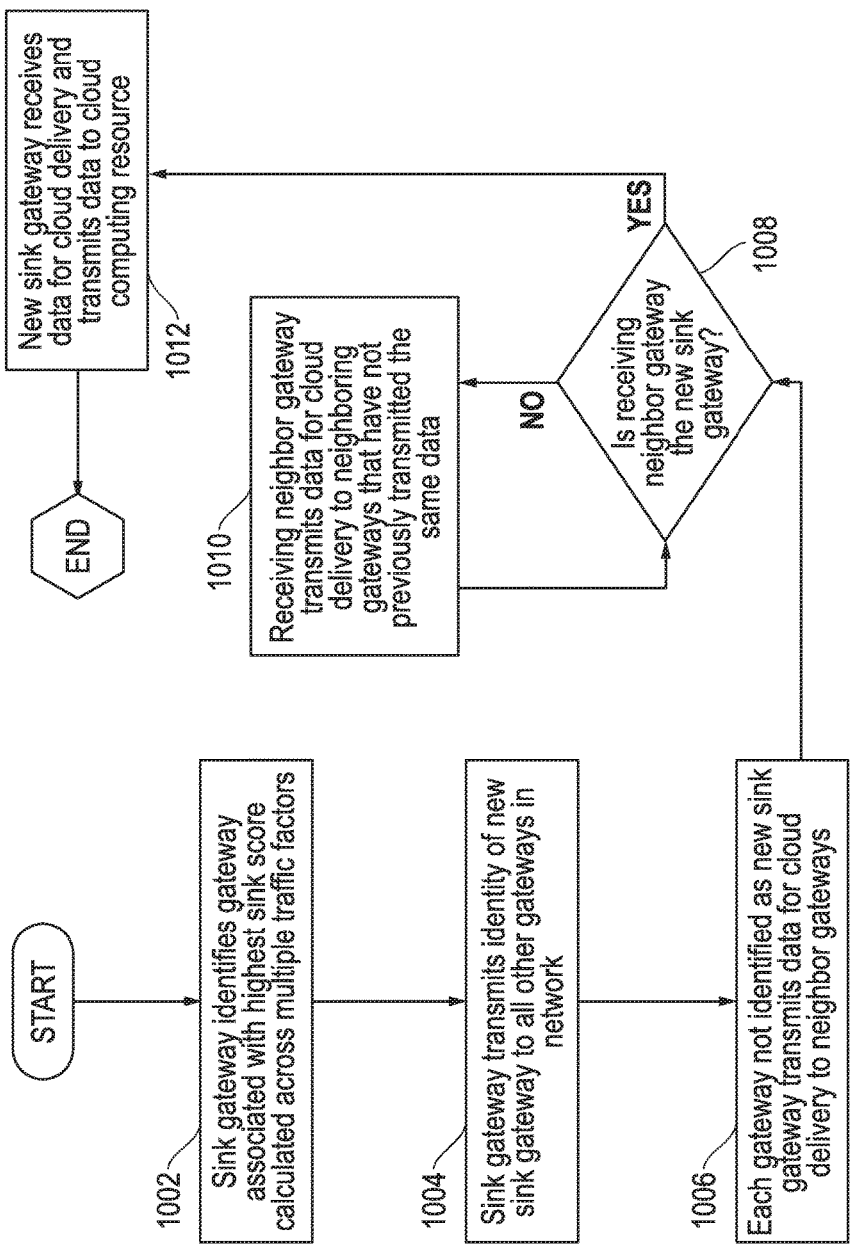
FIG. 10 is a flow diagram illustrating a method of designating a sink gateway in a network of gateways according to an embodiment of the present disclosure.

FIG. 10 is a flow diagram illustrating a method of designating a sink gateway in a network of gateways through which all data within the network bound for the cloud may be routed according to an embodiment of the present disclosure. As described above, a solution is needed to flexibly designate the most efficient gateway as the sink for a wireless network by examining the efficiency of each gateway in a wireless network relating to a plurality of traffic factors, and by dynamically assigning the most efficient gateway as the sink. At block 1002 in an embodiment, a currently designated sink gateway may identify a gateway associated with a highest sink score calculated across multiple traffic factors. A highest sink score may be calculated in an embodiment in a number of ways. One example includes assigning one point to each gateway's sink score for each traffic factor with which that gateway is associated in the factor optimization lookup table. For example, with reference to the factor optimization lookup table 500 in FIG. 5, gateway 1 may be associated with a sink score of 1 because it is only associated with the Hops traffic factor, gateway 2 may be associated with a sink score of 2 because it is associated with the data rate and RSSI traffic factors, gateway 3 may be associated with a sink score of 2 because it is associated with the cost and latency traffic factors, and gateway N may be associated with a sink score of 1 because it is only associated with the lost packets traffic factor.

In another example, the sink score may be calculated by assigning a partial point to each gateway's sink score based on a weighting of the importance of the traffic factors with which that gateway is associated in the factor optimization lookup table. For example, each of the traffic factors may be associated with a weighted importance indicating efficiency with respect to one traffic factor is more important than efficiency with respect to another traffic factor. In such an embodiment, the cost traffic factor may be associated with a 10% weighting, the data rate traffic factor may be associated with a 20% weighting, the hops traffic factor may be associated with a 15% weighting, the RSSI traffic factor may be associated with a 20% weighting, the latency traffic factor may be associated with 25% weighting, and the lost packets traffic factor may be associated with a 10% weighting. The sink scores for each gateway based on these weightings and the factor optimization lookup table 500 of FIG. 5 in an embodiment may be equivalent to 0.15 points for gateway 1, 0.4 points for gateway 2, 0.35 points for gateway 3, and 0.1 points for gateway N. In such an embodiment, gateway 2 may be identified as the sink gateway, at block 1002, since it is associated with a highest sink score of 0.4 points.

It is contemplated other formulas may be used to calculate sink scores for the gateways based upon the factor optimization lookup table in an embodiment, including but not limited to nominating the gateway associated with the greatest number of non-weighted normalized traffic factors, and nominating the gateway associated with a single, non-weighted normalized traffic factor deemed most important. Further, because the sink scores may be calculated based on the factor optimization lookup table, as described above, and the factor optimization lookup table may be routinely updated with recent information, as also described above, the wireless network gateway sink nomination system in an embodiment may employ the method described with reference to FIG. 10 to adapt selection of the sink gateway based on changes in traffic factors for each of the gateways in the network over time.

At block 1004, in an embodiment, the currently designated sink gateway may transmit the identity of the new sink gateway to all other gateways in the network. For example, if the currently designated sink gateway 1 in an embodiment identifies gateway 2 as being associated with the highest sink score of 0.4 points in block 1002, gateway 1 may transmit the designation of gateway 2 as the new sink gateway for the network to all other gateways 2-N within the network. By identifying gateway 2 as the new sink gateway, gateway 1 may notify all gateways within the network that gateway 2 is currently the most efficient gateway in the network for the delivery of content to the cloud.

At block 1006, in an embodiment, each gateway not identified as the new sink gateway may transmit all data bound for the cloud to neighbor gateways. As described above, each gateway in an embodiment may be in communication with all other gateways. In other embodiments, as shown in FIG. 2, some gateways (e.g. gateways 1 and 3) may be in communication with all other gateways, while other gateways (e.g. gateways 2 and N) may be in communication with only some of the other gateways. As shown in FIG. 10 at block 1006, each gateway not identified as the new sink gateway may transmit all data bound for the cloud to neighbor gateways, intending the data to eventually reach the sink gateway if the sink gateway is not an immediate neighbor. For example, gateways 1 and 3 may transmit all data bound for the cloud directly to the newly identified sink gateway 2, because gateway 2 is a neighbor of gateways 1 and 3. As another example, gateway N may transmit all data bound for the cloud to gateways 1 and 3 simultaneously, but cannot directly transmit data to gateway 2, because it is not neighbors with gateway 2.

At block 1008, in an embodiment, it may be determined whether the neighbor gateway receiving the transmission sent at block 1006 is the newly identified sink gateway. For example, gateways 1 and 3 in an embodiment may transmit all data bound for the cloud directly to the newly identified sink gateway 2 at block 1006, and the receiving gateway 2 may determine the received data has, in fact, reached the newly identified sink gateway. If the receiving neighbor gateway is identified as the new sink gateway in an embodiment, the method may proceed to block 1012. As another example, gateway N in an embodiment may transmit all data bound for the cloud to gateways 1 and 3 simultaneously at block 1006, and receiving gateways 1 and 3 may both determine the received data has not reached the newly identified sink gateway 2. If the receiving neighbor gateway is not identified as the new sink gateway in an embodiment, the method may proceed to block 1010.

At block 1010, in an embodiment the receiving neighbor gateway may transmit the data bound for the cloud to its own neighboring gateways that have not previously transmitted the same data. For example, gateway N in an embodiment may transmit all data bound for the cloud to gateways 1 and 3 simultaneously at block 1006, receiving gateways 1 and 3 may both determine the received data has not reached the newly identified sink gateway 2 at block 1008, and receiving gateways 1 and 3 may both transmit the data to each of their remaining neighbors that have not yet received the data. Because gateway 1 is neighbors with gateways 2-N, gateway 3 is neighbors with gateways 1-N, and gateways 1, 3, and N have all received the data previously, gateways 1 and 3 in such an embodiment may both transmit the data bound for the cloud to gateway 2. Upon transmission of the data bound for the cloud to the neighbor gateways that have not yet received the data, the method may proceed back to block 1008, and this loop may be repeated until the data bound for the cloud reaches the newly identified sink gateway.

At block 1012, the new sink gateway in an embodiment may receive the data bound for the cloud from all gateways in the network, and may transmit the received data to a cloud computing resource. The cloud computing resource in an embodiment may be the same cloud computing resource to which each of the gateways had previously transmitted broadcast messages such as the echo request ICMP message discussed above. By transmitting all data bound for the cloud to a sink gateway chosen dynamically and adaptively from all of the gateways in the network based on recent calculations of a plurality of traffic factors, the wireless network gateway sink nomination system in an embodiment may ensure data is delivered to the cloud by a gateway device recently determined to have the most efficient connection to the cloud computing resource.

The blocks of the flow diagrams of FIGS. 6-10 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating as a first gateway in a wireless network comprising:
   a wireless network interface device of the first gateway transmitting instructions for echo replies for determining wireless link quality traffic factors for a plurality of wireless links between a plurality of gateways in the wireless network and a cloud computing resource accessible by each of the plurality of gateways, which includes the first gateway, wherein the wireless link quality traffic factors include one or more of resource cost, data rate, received signal strength indicators (RSSI), latency, or lost packets;
   a processor identifying an optimal wireless link from the plurality of wireless links based on two or more wireless link quality traffic factors having optimal values, as compared to the wireless link quality traffic factors of the remaining plurality of wireless links, wherein the optimal values includes a lowest cost, a highest data rate, a highest RSSI, a lowest latency, or a lowest number of lost packets;
   the processor identifying an optimal sink gateway from the plurality of gateways having the optimal wireless link to access the cloud computing resource; and
   the wireless network interface device transmitting an identification of the optimal sink gateway to each of the plurality of gateways, and routing traffic bound for the cloud computing resource through the optimal sink gateway.

2. The information handling system of claim 1, wherein the wireless link quality traffic factors further include a number of hops, and the optimal values includes a lowest number of hops.

3. The system of claim 1, wherein each of the wireless link quality traffic factors, including cost, data rate, received signal strength indicators (RSSI), latency, or lost packets is associated with a weighting factor, and the optimal wireless link is associated with a highest optimal sink score equivalent to normalized values for the two or more wireless link quality traffic factors having optimal values, multiplied by their respective weighting factors.

4. The system of claim 1 further comprising:
   the processor excluding wireless link quality traffic factors failing to meet preset threshold requirements from consideration in identifying the optimal wireless link.

5. The system of claim 1, wherein at least one of the plurality of gateways is capable of communication according to at least two different WPAN standards.

6. The system of claim 1, wherein the wireless network adheres to an ad-hoc on demand vector (AODV) routing protocol.

7. The system of claim 1, wherein the network adheres to a routing protocol for low-power and lossy networks (RPL).

8. A method of updating identification of an optimal sink gateway in a wireless network comprising:
   identifying within the wireless network, via a processor, an optimal sink gateway within a plurality of gateways capable of accessing a cloud computing resource;
   after a first identification of the optimal sink gateway, transmitting instructions for echo replies for updated wireless link quality traffic factors, via a wireless network interface device, for a plurality of wireless links between the plurality of gateways and the cloud computing resource, which includes the optimal sink gateway, wherein the wireless link quality traffic factors include one or more of resource cost, data rate, received signal strength indicators (RSSI), latency, or lost packets;
   identifying, via the processor, an updated optimal wireless link from the plurality of wireless links based on two or more wireless link quality traffic factors having optimal values, as compared to the wireless link quality traffic factors of the remaining plurality of wireless links, wherein the updated optimal values includes a lowest cost, a highest data rate, a highest RSSI, a lowest latency, or a lowest number of lost packets;

identifying an updated optimal sink gateway from the plurality of gateways having the updated optimal wireless link to access the cloud computing resource, via the processor; and transmitting, via a wireless network interface device, an identification of the updated optimal sink gateway to each of the plurality of gateways; and routing traffic bound for the cloud computing resource, via the wireless network network interface device, through the updated optimal sink gateway.

9. The method of claim 8, wherein the wireless link quality traffic factors further include a number of hops, and the optimal values includes a lowest number of hops.

10. The method of claim 8, wherein each of the wireless link quality traffic factors, including cost, data rate, received signal strength indicators (RSSI), latency, or lost packets is associated with a weighting factor, and the optimal wireless link is associated with a highest optimal sink score equivalent to normalized values for the two or more wireless link quality traffic factors having optimal values, multiplied by their respective weighting factors.

11. The method of claim 8 further comprising:
excluding the wireless link quality traffic factor failing to meet preset threshold requirements from consideration in identifying the updated optimal wireless link.

12. The method of claim 8, wherein each of the plurality of gateways is capable of communication according to a different WPAN standard.

13. The method of claim 8, wherein the wireless network adheres to an ad-hoc on demand vector (AODV) routing protocol.

14. The method of claim 8, wherein the wireless network adheres to a routing protocol for low-power and lossy networks (RPL).

15. An information handling system of a first gateway in a wireless network comprising:
a wireless network interface device of the first gateway transmitting instructions for echo replies for determining wireless link quality traffic factors for a plurality of wireless links between a plurality of gateways in the wireless network and a cloud computing resource accessible by each of the plurality of gateways, which includes the first gateway, wherein the wireless link quality traffic factors include one or more of resource cost, data rate, received signal strength indicators (RSSI), latency, hops, or lost packets, and wherein each of the wireless link quality traffic factors is associated with a weighting factor;

a processor identifying an optimal wireless link from the plurality of wireless links based on two or more wireless link quality traffic factors having optimal values, as compared to the wireless link quality traffic factors of the remaining plurality of wireless links, wherein the optimal values includes a lowest cost, a highest data rate, a highest RSSI, a lowest latency, a lowest number of hops, or a lowest number of lost packets, wherein the optimal wireless link is associated with a highest optimal sink score equivalent to normalized values for the two or more wireless link quality traffic factors having optimal values, multiplied by their respective weighting factors;

the processor identifying an optimal sink gateway from the plurality of gateways having the optimal wireless link to access the cloud computing resource; and the wireless network interface device transmitting an identification of the optimal sink gateway to each of the plurality of gateways, and routing traffic bound for the cloud computing resource through the optimal sink gateway.

16. The system of claim 15 further comprising:
the processor excluding wireless link quality traffic factors failing to meet preset threshold requirements from consideration in identifying the updated optimal wireless link.

17. The system of claim 15, wherein one of the plurality of gateways is capable of communication according to two different WPAN standards.

18. The system of claim 15, wherein the wireless network adheres to an ad-hoc on demand vector (AODV) routing protocol.

19. The system of claim 15, wherein the wireless network adheres to a routing protocol for low-power and lossy networks (RPL).

20. The system of claim 15, wherein the wireless network adheres to the 6LoWPAN standard.

* * * * *